United States Patent
Hernandez et al.

(10) Patent No.: US 11,976,169 B2
(45) Date of Patent: May 7, 2024

(54) BIOADVANTAGED NYLON: POLYCONDENSATION OF 3-HEXENEDIOIC ACID WITH HEXAMETHYLENEDIAMINE

(71) Applicant: Iowa State University Research Foundation, Inc., Ames, IA (US)

(72) Inventors: Nacu Hernandez, Ames, IA (US); Mengguo Yan, San Jose, CA (US); Eric William Cochran, Ames, IA (US); John Edward Matthiesen, Hillsboro, OR (US); Jean-Philippe Tessonnier, Ames, IA (US)

(73) Assignee: IOWA STATE UNIVERSITY RESEARCH FOUNDATION, INC., Ames, IA (US)

( * ) Notice: Subject to any disclaimer, the term of this patent is extended or adjusted under 35 U.S.C. 154(b) by 0 days.

(21) Appl. No.: 17/841,095

(22) Filed: Jun. 15, 2022

(65) Prior Publication Data
US 2022/0315700 A1  Oct. 6, 2022

Related U.S. Application Data

(60) Continuation of application No. 17/004,613, filed on Aug. 27, 2020, now Pat. No. 11,401,377, which is a
(Continued)

(51) Int. Cl.
*C08G 69/26* (2006.01)
*C08G 69/28* (2006.01)
(Continued)

(52) U.S. Cl.
CPC .......... *C08G 69/265* (2013.01); *C08G 69/26* (2013.01); *C08G 69/28* (2013.01); *C08G 69/48* (2013.01);
(Continued)

(58) Field of Classification Search
CPC ...... C08G 69/48; C08G 69/26; C08G 69/265; C08G 63/918; C08G 77/455; C08J 2367/06
See application file for complete search history.

(56) References Cited

U.S. PATENT DOCUMENTS

| 2,864,807 | A | * | 12/1958 | Nobis | .................... | C08G 69/26 528/340 |
| 3,240,759 | A |   | 3/1966  | Crovatt, Jr. et al. | | |

(Continued)

FOREIGN PATENT DOCUMENTS

| CN | 102660018 A | 9/2012 |
| CN | 112646153 A | 4/2021 |

(Continued)

OTHER PUBLICATIONS

Suastegui et al. "Combining Metabolic Engineering and Electrocatalysis: Application to the Production of Polyamides from Sugar," Angew. Chem. Int. Ed. Engl. Communication 55(7):2368-2373 (2016).
(Continued)

*Primary Examiner* — Michael M Dollinger
(74) *Attorney, Agent, or Firm* — Troutman Pepper Hamilton Sanders LLP

(57) ABSTRACT

The present invention relates to a polymer comprising a repeating group having the structure of formula (I)

(Continued)

wherein R, $R^1$, $R^2$, $R^3$, $R^4$, X, and s are as described herein and salt thereof. Also disclosed is a process of synthesizing such polymers.

5 Claims, 9 Drawing Sheets

Related U.S. Application Data division of application No. 15/348,561, filed on Nov. 10, 2016, now Pat. No. 10,793,673.

(60) Provisional application No. 62/253,485, filed on Nov. 10, 2015.

(51) Int. Cl.
  *C08G 69/48* (2006.01)
  *C08G 77/455* (2006.01)
  *C08G 81/02* (2006.01)

(52) U.S. Cl.
  CPC ......... *C08G 77/455* (2013.01); *C08G 81/028* (2013.01)

(56) References Cited

U.S. PATENT DOCUMENTS

| | | | |
|---|---|---|---|
| 3,352,835 A | | 11/1967 | Fritz et al. |
| 3,483,105 A | | 12/1969 | Gaetano |
| 3,558,547 A | | 1/1971 | Kronstein |
| 4,012,365 A | | 3/1977 | Moriyama et al. |
| 4,248,654 A | | 2/1981 | Gude et al. |
| 4,442,260 A | | 4/1984 | Larsen |
| 4,599,393 A | * | 7/1986 | Policastro ............... C08G 69/42 528/21 |
| 5,177,160 A | * | 1/1993 | Mikami ............... C08G 63/6954 528/10 |
| 5,919,441 A | * | 7/1999 | Mendolia ............... A61Q 15/00 514/846 |
| 5,981,680 A | * | 11/1999 | Petroff ............... A61K 8/898 528/31 |
| 6,024,816 A | | 2/2000 | Yamakawa et al. |
| 8,450,447 B2 | | 5/2013 | Harris et al. |
| 8,592,189 B2 | | 11/2013 | Burgard et al. |
| 10,633,750 B2 | | 4/2020 | Tessonnier et al. |
| 10,655,025 B2 | | 5/2020 | Farrugua et al. |
| 10,793,673 B2 | | 10/2020 | Hernandez et al. |
| 11,401,377 B2 | | 8/2022 | Hernandez et al. |
| 2010/0203275 A1 | | 8/2010 | Hoffmann et al. |
| 2010/0314243 A1 | | 12/2010 | Frost et al. |
| 2011/0052848 A1 | | 3/2011 | Doshi et al. |
| 2011/0189419 A1 | | 8/2011 | Le et al. |
| 2012/0301659 A1 | | 11/2012 | Rao |
| 2015/0376341 A1 | | 12/2015 | Ait-Haddou et al. |
| 2016/0017381 A1 | | 1/2016 | Beckham et al. |
| 2016/0347929 A1 | | 12/2016 | Bendler et al. |
| 2017/0129839 A1 | | 5/2017 | Tessonnier et al. |
| 2017/0130001 A1 | | 5/2017 | Hernandez et al. |
| 2019/0153156 A1 | | 5/2019 | Matthiesen et al. |
| 2019/0352521 A1 | | 11/2019 | Farrugua et al. |
| 2023/0373895 A1 | | 11/2023 | Tessonnier et al. |

FOREIGN PATENT DOCUMENTS

| | | |
|---|---|---|
| DE | 19712248 A1 | 10/1998 |
| EP | 0910599 B1 | 3/2004 |
| EP | 2910600 A1 | 8/2013 |
| EP | 3782976 A1 | 2/2021 |
| JP | H06248062 A | 9/1994 |
| JP | 2003320618 A | 11/2003 |
| WO | 2014/104483 A1 | 7/2014 |
| WO | 2016/077361 A1 | 5/2016 |
| WO | 2019/099759 A1 | 5/2019 |
| WO | 2019/235559 A1 | 12/2019 |
| WO | 2022/061271 A1 | 3/2022 |
| WO | 2022/061275 A1 | 3/2022 |

OTHER PUBLICATIONS

Machine Translation of JP 2003320618 (Year: 2019).
Machine Translation of WO 201404483 (Year: 2019).
Olson et al., "Preparation of Unsaturated Linear Aliphatic Polyesters Using Condensation of Polymerization," Macromolecules 39(8):2808-2814 (2006).
Olson et al., "Amorphous Linear Aliphatic Polyesters for the Facile Preparation of Tunable Rapidly Degrading Elastomeric Devices and Delivery Vectors," J. Am. Chem. Soc. 128(41):13625-13633 (2006).
Cohran et al., "BRDI: Bioadvantaged Heterogeneous Polymers for Green Packaging Applications," Grant Proposal Mar. 27, 2015.
International Search Report and Written Opinion for Application No. PCT/US18/61410 (dated Mar. 22, 2019).
Hernandez et al., "Unsaturated Diacids for the Production of Bio-Enabled Nylon," NSF IIP Conference, Poster, Atlanta, GA (Jun. 3, 2018).
Tessonnier, "Unsaturated Diacids for the Production of Bio-Advantaged Nylon," Presentation (2018).
Invitation to pay additional fees for Application No. PCT/US18/61410 (dated Jan. 23, 2019).
Fredrickson et al., "Multicritical Phenomena and Microphase Ordering in Random Block Copolymer Melts," Macromolecules 25:6341-6354 (1992).
Matthiesen et al., "Electrochemical Conversion of Biologically Produced Muconic Acid: Key Considerations for Scale-Up and Corresponding Technoeconomic Analysis," ACS Sustainable Chem. Eng. 4:7098-7109 (2016).
Odian, Principles of Polymerization, 3rd Ed., Staten Island, NY: John Wiley & Sons, Inc, pp. 19-23 and 141-149 (1991).
Office Action for U.S. Appl. No. 16/192,937 (dated May 3, 2021).
Office Action for U.S. Appl. No. 16/192,937 (dated Nov. 10, 2020).
Office Action for U.S. Appl. No. 15/348,561 (dated Nov. 20, 2019).
Office Action for U.S. Appl. No. 15/348,561 (dated Mar. 22, 2019).
International Preliminary Report on Patentability for Application No. PCT/US18/61410 (dated May 19, 2020).
Office Action for U.S. Appl. No. 16/192,937 (dated Jan. 21, 2022).
Akiba et al., "Vulcanization and Crosslinking in Elastomers," Prog. Polym. Sci. 22:475-521 (1997).
Alibeik et al., The Effect of Thiolation on the Mechanical and Protein Adsorption Properties of Polyurethanes, European Polymer Journal 43:1415-1427 (2007).
Ates et al., "Side-Chain Functionalisation of Unsaturated Polyesters from Ring-Opening Polymerisation of Macrolactones by Thiol-Ene Click Chemistry," Polymer Chemistry 2:309-312 (2011).
Hoyle et al., "Thiol-Ene Click Chemistry," Angew. Chem. Int. Ed. 49:1540-1573 (2010).
Office Action for U.S. Appl. No. 17/004,613 (dated Dec. 9, 2021).
International Preliminary Report on Patentability for PCT/US2021/051236 (dated Mar. 21, 2023).
Capelli et al., "Bio-Adipic Acid Production by Catalysed Hydrogenation of Muconicacid in Mild Operating Conditions," Applied Catalysis B: Environmental 218:220-229 (2017).
U.S. Appl. No. 18/027,492 to Tessonnier et al. filed Mar. 21, 2023, first named inventor Jean-Philippe Tessonnier.
International Preliminary Report on Patentability for PCT/US2021/051220 (dated Mar. 21, 2023).
International Search Report and Written Opinion for Application No. PCT/US2021/051236 (dated Feb. 17, 2022).
International Search Report and Written Opinion for Application No. PCT/US2021/051220 (dated Feb. 18, 2022).
"PubChem SID 369540629" [online database] [retrieved on Nov. 23, 2021] Retrieved from PubChem(https://pubchem.ncbi.nlm.nih.gov/substance/369540629) (May 25, 2018).
U.S. Appl. No. 18/027,480 to Tessonnier et al. filed Mar. 21, 2023, first named inventor Jean-Philippe Tessonnier.
U.S. Appl. No. 18/357,269 to Cochran et al. filed Jul. 24, 2023, first named inventor Eric William Cochran.

(56) References Cited

OTHER PUBLICATIONS

International Search Report and Written Opinion for Application No. PCT/US2023/028434 (dated Dec. 19, 2023).
Invitation to Pay Additional Fees for Application No. PCT/US2023/028434 (dated Oct. 27, 2023).
Karayannidis et al., "Synthesis, Crystallization and Tensile Properties of Poly(ethylene Terephthalate-co-2, 6-naphthalate)s with Low Naphthalate Units Content," Polymer 44:7801-7808 (2003).
U.S. Appl. No. 18/682,576 to Tessonnier et al. filed on Feb. 9, 2024, first named inventor Jean-Philippe Tessonnier.

* cited by examiner

BIOADVANTAGED NYLON: POLYCONDENSATION OF 3-HEXENEDIOIC ACID WITH HEXAMETHYLENEDIAMINE

This application is a continuation of U.S. patent application Ser. No. 17/004,613, filed Aug. 27, 2020, which is a divisional of U.S. patent application Ser. No. 15/348,561, filed Nov. 10, 2016, which claims priority benefit of U.S. Provisional Patent Application No. 62/253,485, filed Nov. 10, 2015, which is hereby incorporated by reference in its entirety.

This invention was made with government support under EEC0813570 awarded by National Science Foundation and DE-AC02-07CH11358 awarded by the Department of Energy. The government has certain rights in the invention.

FIELD OF THE INVENTION

The present invention relates to bioadvantaged nylon: polycondensation of 3-hexenedioic acid with hexamethylenediamine.

BACKGROUND OF THE INVENTION

The global annual market for flexible packaging was nearly $200 billion in 2014, representing well over 2.5 million metric tons of plastics and a major source of waste. Multilayer packaging films (MPFs) comprise a significant fraction of this market; MPFs are assembled from as many as 7 different resins to deliver the net performance characteristics demanded by the diverse variety of packaging applications (e.g. food, medical, electronics). Nylon is a major packaging resin owing to its mechanical strength/toughness and gas barrier properties; however, nylon's adherence to other polymers is notoriously poor. This adhesion may be enhanced through the use of a tie layer, a specially formulated heterogeneous polymer that is designed to efficaciously adhere two otherwise incompatible polymers. Thermoplastic elastomers (TPEs) are also extensively used in the packaging industry. TPEs are heterogeneous polymers that combine hard and soft constituents to create the emergent property of elasticity.

Adipic acid is a monomer derived from petrochemical feedstocks and mainly used for the production of nylon 6,6 (Musser, M. T., "Adipic Acid," *Ullman's Encyclopedia of Industrial Chemistry* (2000)). Nylon-6,6 is a polyamide produced from the polycondensation reaction of adipic acid and hexamethylenediamine (HMDA) with a market share of US$20.5 billion in 2013 and US$40 billion by 2020 (Acmite Market Intelligence, "Market Report. Global Polyamide Market," 521 pp. (December 2014)). Nylon-6,6, a semi-crystalline polymer, is used in numerous applications where high-temperature, solvent-proof, electrically-shielded parts are needed (Sabreen, S., "Adhesive Bonding of Polyamide (Nylon)," *Plastics Decorating* 2 pp. (2015)). However, nylon 6,6 suffers from some drawbacks that prevents it from being used even further—i.e. poor surface wettability and the hygroscopicity (nylon will absorb moisture >3%/mass of water from the atmosphere) (Sabreen, S., "Adhesive Bonding of Polyamide (Nylon)," *Plastics Decorating* 2 pp. (2015)).

The present invention is directed to overcoming these and other deficiencies in the art.

SUMMARY OF THE INVENTION

One aspect of the present invention relates to a polymer comprising a repeating group having the structure of formula (I):

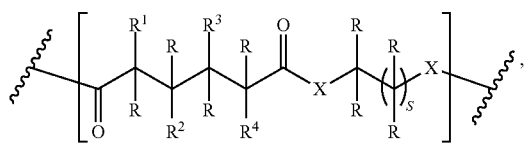

wherein
X is NH or O;
R is independently selected from the group consisting of H and $C_{1\text{-}20}$ alkyl;
$R^1$, $R^2$, $R^3$, and $R^4$ are independently selected from the group consisting of H, —U—$C_{1\text{-}1002}$ alkyl, —U—$C_{1\text{-}20}$ alkyl-OH, and

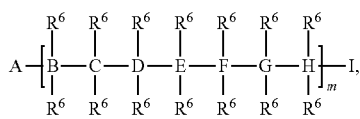

wherein each —U—$C_{1\text{-}1002}$ alkyl and —U—$C_{1\text{-}20}$ alkyl-OH can be optionally substituted 1-4 times with a substituent independently selected at each occurrence thereof from the group consisting of H, —OH, —$SO_3R^5$, —P(O)(OR$^5$)$_2$, —N(R$^5$)$_2$, —N(R$^5$)$_3{}^+$Hal$^-$, and

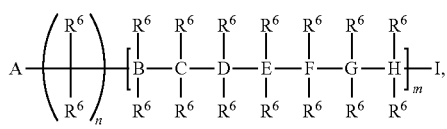

with the proviso that at least one of $R^1$, $R^2$, $R^3$, or $R^4$ is not hydrogen;
A and I are independently selected from the group consisting of a point of attachment (to formula (I) or $R^1$, $R^2$, $R^3$, or $R^4$),

H, —Si(R$^6$)$_3$, $C_{1\text{-}20}$ alkyl,

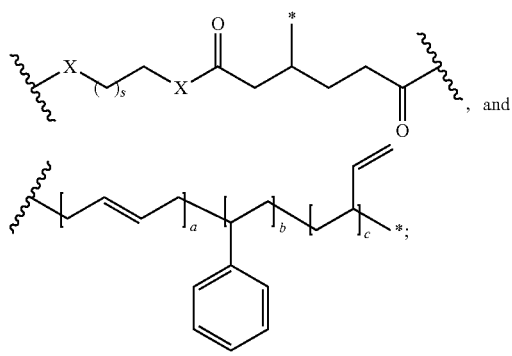

, and

B, C, D, E, F, G, and H are independently selected from the group consisting of a bond, C, O, Si, N, or U;

$R^5$ is independently selected at each occurrence thereof from the group consisting of H, $C_{1-6}$ alkyl, and halogen;

$R^6$ is optional, and if present, is independently selected at each occurrence thereof from the group consisting of a point of attachment (to formula (I) or $R^1$, $R^2$, $R^3$, or $R^4$), H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —N($R^7$)$_2$, —C(O)$R^7$, and —C(O)—X—CH$_2$—(CH$_2$)$_s$—XR$^7$;

$R^7$ is independently selected at each occurrence thereof from the group consisting of H, $C_{1-6}$ alkyl, and

;

U is optional and, if present, is S;

*— is a point of attachment to formula (I) or $R^1$, $R^2$, $R^3$, or $R^4$;

is a terminal group of the polymer;

a is 1-1,000,000;
b is 1-1,000,000;
c is 1-1,000,000;
d is 1-1,000,000;
e is 1-1,000,000;
m is 0 to 1,000,000;
n is 0 to 10; and
s is 1 to 50;

or a salt thereof.

Another aspect of the present invention relates to a polymer comprising a repeating group having the structure of formula (I):

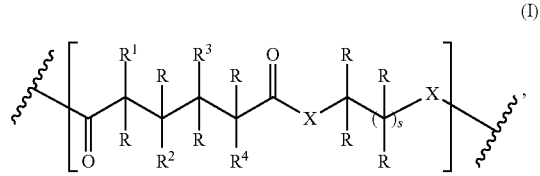
(I)

wherein

X is NH or O;

R is independently selected from the group consisting of H and $C_{1-20}$ alkyl;

$R^1$, $R^2$, $R^3$, and $R^4$ are independently selected from the group consisting of H, —U—$C_{1-1002}$ alkyl, —U—$C_{1-20}$ alkyl-OH, and

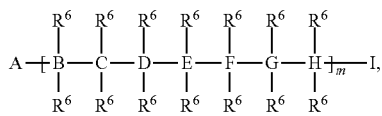

wherein each —U—$C_{1-1002}$ alkyl and —U—$C_{1-20}$ alkyl-OH can be optionally substituted 1-4 times with a substituent independently selected at each occurrence thereof from the group consisting of H, —OH, —SO$_3$R$^5$, —P(O)(OR$^5$)$_2$, —N(R$^5$)$_2$, —N(R$^5$)$_3$$^+$Hal$^-$, and

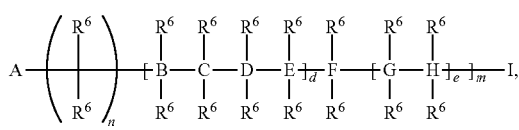

with the proviso that at least one of $R^1$, $R^2$, $R^3$, or $R^4$ is not hydrogen;

A and I are independently selected from the group consisting of a point of attachment (to formula (I) or $R^1$, $R^2$, $R^3$, or $R^4$),

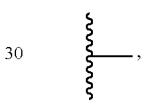
,

H, —Si($R^6$)$_3$, $C_{1-20}$ alkyl,

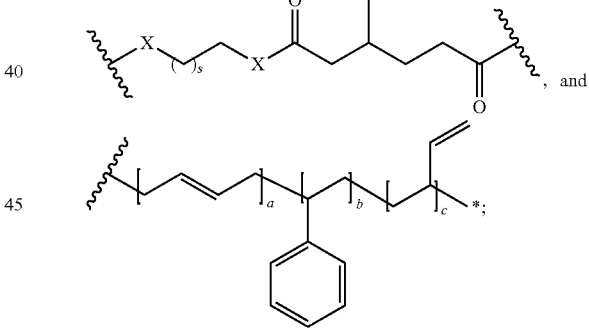
, and

B, C, D, E, F, G, and H are independently selected from the group consisting of a bond, C, O, Si, N, or U;

$R^5$ is independently selected at each occurrence thereof from the group consisting of H, $C_{1-6}$ alkyl, and halogen;

$R^6$ is optional, and if present, is independently selected at each occurrence thereof from the group consisting of a point of attachment (to formula (I) or $R^1$, $R^2$, $R^3$, or $R^4$), H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —N($R^7$)$_2$, —C(O)$R^7$, and —C(O)—X—CH$_2$—(CH$_2$)$_s$—XR$^7$;

$R^7$ is independently selected at each occurrence thereof from the group consisting of H, $C_{1-6}$ alkyl, and

;

U is optional and, if present, is —(S)$_p$—;
*— is a point of attachment to formula (I) or R$^1$, R$^2$, R$^3$, or R$^4$;

is a terminal group of the polymer;
a is 1-1,000,000;
b is 1-1,000,000;
c is 1-1,000,000;
d is 1-1,000,000;
e is 1-1,000,000;
m is 0 to 1,000,000;
n is 0 to 10;
p is 1 to 8; and
s is 1 to 50;
or a salt thereof.

Another aspect of the present invention relates to a process for preparation of a polymer comprising a repeating group having the structure of formula (I):

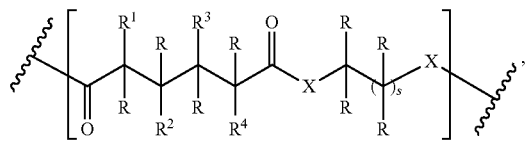
(I)

wherein
X is NH or O;
R is independently selected from the group consisting of H and C$_{1-20}$ alkyl;
R$^1$, R$^2$, R$^3$, and R$^4$ are independently selected from the group consisting of H, —U—C$_{1-1002}$ alkyl, —U—C$_{1-20}$ alkyl-OH, and

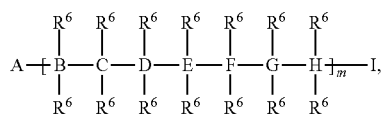

wherein each —U—C$_{1-1002}$ alkyl and —U—C$_{1-20}$ alkyl-OH can be optionally substituted 1-4 times with a substituent independently selected at each occurrence thereof from the group consisting of H, —OH, —SO$_3$R$^5$, —P(O)(OR$^5$)$_2$, —N(R$^5$)$_2$, —N(R$^5$)$_3$$^+$Hal$^-$, and

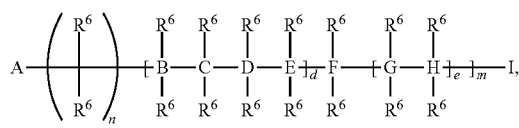

with the proviso that at least one of R$^1$, R$^2$, R$^3$, or R$^4$ is not hydrogen;
A and I are independently selected from the group consisting of a point of attachment (to formula (I) or R$^1$, R$^2$, R$^3$, or R$^4$),

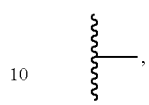

H, —Si(R$^6$)$_3$, C$_{1-20}$ alkyl,

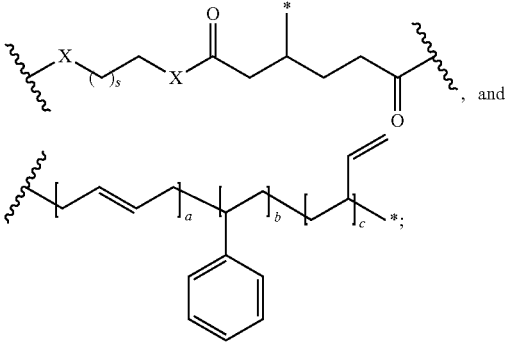, and

B, C, D, E, F, G, and H are independently selected from the group consisting of a bond, C, O, Si, N, or U;
R$^5$ is independently selected at each occurrence thereof from the group consisting of H, C$_{1-6}$ alkyl, and halogen;
R$^6$ is optional, and if present, is independently selected at each occurrence thereof from the group consisting of a point of attachment (to formula (I) or R$^1$, R$^2$, R$^3$, or R$^4$), H, OH, halogen, C$_{1-6}$ alkyl, —CN, and phenyl, wherein each phenyl and C$_{1-6}$ alkyl can be optionally substituted 1-4 times with a substituent independently selected at each occurrence thereof from the group consisting of H, —OH, halogen, —CN, —N(R$^7$)$_2$, —C(O)R$^7$, and —C(O)—X—CH$_2$—(CH$_2$)$_s$—XR$^7$;
R$^7$ is independently selected at each occurrence thereof from the group consisting of H, C$_{1-6}$ alkyl, and

;

U is optional and, if present, is S;
*— is a point of attachment to formula (I) or R$^1$, R$^2$, R$^3$, or R$^4$;

is a terminal group of the polymer;
a is 1-1,000,000;
b is 1-1,000,000;
c is 1-1,000,000;
d is 1-1,000,000;

e is 1-1,000,000;
m is 0 to 1,000,000;
n is 0 to 10; and
s is 1 to 50;
or a salt thereof.

This process includes:
providing a first intermediate polymeric compound comprising a repeating group having the structure of formula (II):

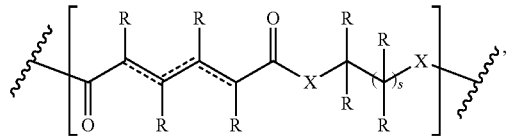
(II)

wherein each === is independently a single or a double bond with no adjacent double bonds, and wherein at least one === is a double bond; and forming the polymer comprising a repeating group having the structure of formula (I) from the first intermediate polymeric compound comprising a repeating group having the structure of formula (II).

Yet another aspect of the present invention relates to a process for preparation of a polymer comprising a repeating group having the structure of formula (I):

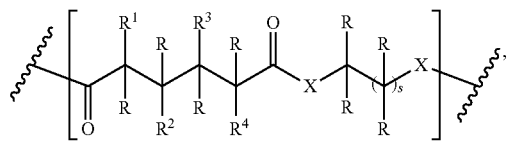
(I)

X is NH or O;
R is independently selected from the group consisting of H and $C_{1-20}$ alkyl;
$R^1$, $R^2$, $R^3$, and $R^4$ are independently selected from the group consisting of H, —U—$C_{1-1002}$ alkyl, —U—$C_{1-20}$ alkyl-OH,

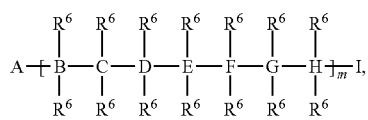

and wherein each —U—$C_{1-1002}$ alkyl and —U—$C_{1-20}$ alkyl-OH can be optionally substituted 1-4 times with a substituent independently selected at each occurrence thereof from the group consisting of H, —OH, —$SO_3R^5$, —$P(O)(OR^5)_2$, —$N(R^5)_2$, —$N(R^5)_3^+Hal^-$, and

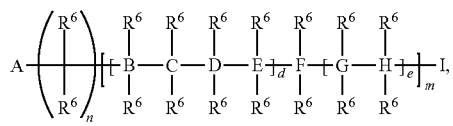

with the proviso that at least one of $R^1$, $R^2$, $R^3$, or $R^4$ is not hydrogen;

A and I are independently selected from the group consisting of a point of attachment (to formula (I) or $R^1$, $R^2$, $R^3$, or $R^4$),

H, —$Si(R^6)_3$, $C_{1-20}$ alkyl,

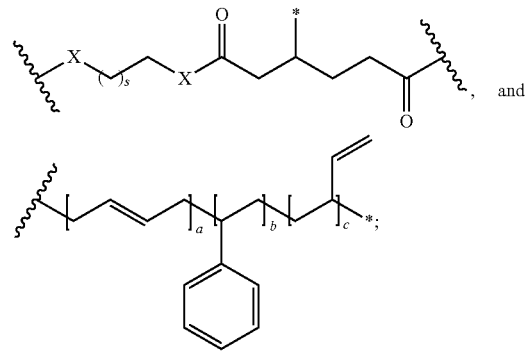

B, C, D, E, F, G, and H are independently selected from the group consisting of a bond, C, O, Si, N, or U;
$R^5$ is independently selected at each occurrence thereof from the group consisting of H, $C_{1-6}$ alkyl, and halogen;
$R^6$ is optional, and if present, is independently selected at each occurrence thereof from the group consisting of a point of attachment (to formula (I) or $R^1$, $R^2$, $R^3$, or $R^4$), H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —$N(R^7)_2$, —$C(O)R^7$, and —C(O)—X—$CH_2$—$(CH_2)_s$—$XR^7$;
$R^7$ is independently selected at each occurrence thereof from the group consisting of H, $C_{1-6}$ alkyl, and

U is optional and, if present, is —$(S)_p$—;
*— is a point of attachment to formula (I) or $R^1$, $R^2$, $R^3$, or $R^4$;

is a terminal group of the polymer;
a is 1-1,000,000;
b is 1-1,000,000;
c is 1-1,000,000;
d is 1-1,000,000;
e is 1-1,000,000;
m is 0 to 1,000,000;

n is 0 to 10;
p is 1 to 8; and
s is 1 to 50;
or a salt thereof.
This process includes:
providing a first intermediate polymeric compound comprising a repeating group having the structure of formula (II):

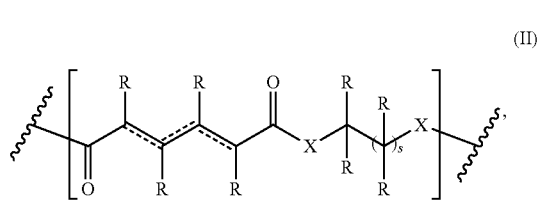

wherein each === is independently a single or a double bond with no adjacent double bonds, and wherein at least one === is a double bond; and forming the polymer comprising a repeating group having the structure of formula (I) from the first intermediate polymeric compound comprising a repeating group having the structure of formula (II).

The invention permits the production of bioadvantaged nylon-6,6 from 3-hexenedioic acid, adipic acid, and hexamethylenediamine, as well as a standalone nylon-6,6 analog, produced from 3-hexenedioic acid (HDA) and hexamethylenediamine (HMDA). Nylon-6,6 analog has an extra double bond in its backbone that can be used to add functionality, graft-to, control crosslinking rate, act as a blend compatibilizers, etc. The present invention uses unsaturated double bond to crosslink or attach different chemical groups to add properties like elongation, flame resistance, stain resistance, antistatic behavior, reduced hygroscopicity, among others.

Additionally the present invention uses unsaturated double bond to add antibacterial properties, tunable glass transition and melting temperatures, tunable hydrophobicity and hydrophilicity.

DETAILED DESCRIPTION OF THE INVENTION

Figure 1:
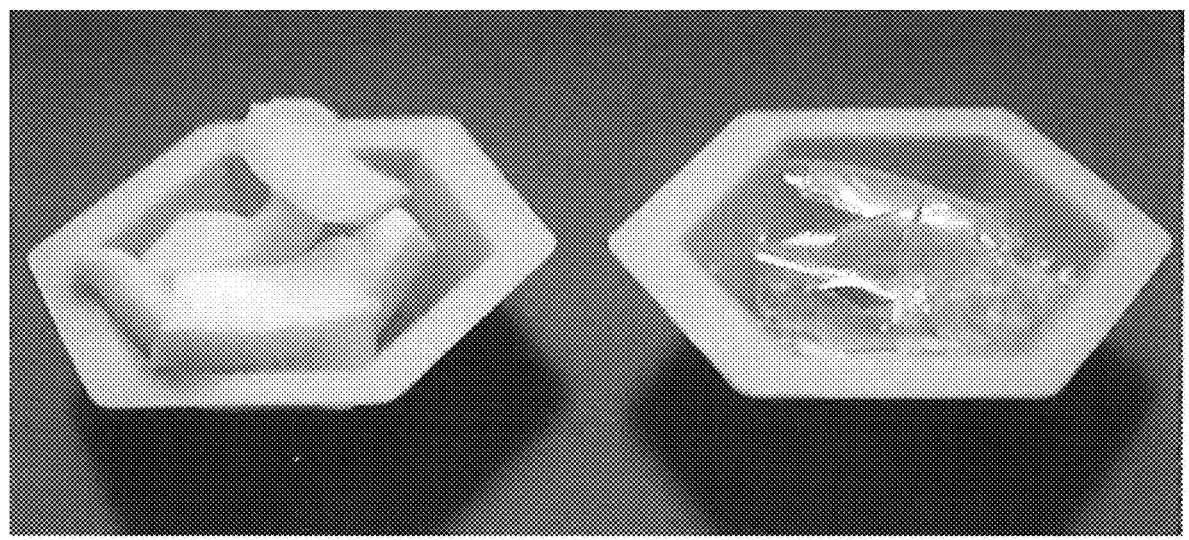
FIG. 1 is the image of the biodvantaged nylon-6,6 (left) and HDA-HMDA polymer (right).

One aspect of the present invention relates to a polymer comprising a repeating group having the structure of formula (I):

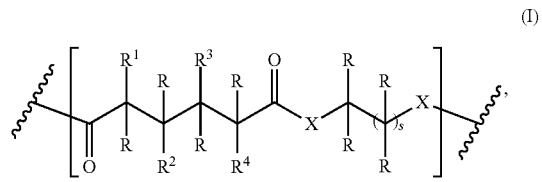

wherein
X is NH or O;
R is independently selected from the group consisting of H and $C_{1-20}$ alkyl;
$R^1$, $R^2$, $R^3$, and $R^4$ are independently selected from the group consisting of H, —U—$C_{1-1002}$ alkyl, —U—$C_{1-20}$ alkyl-OH, and

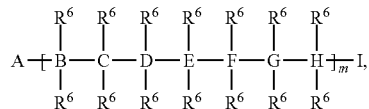

wherein each —U—$C_{1-1002}$ alkyl and —U—$C_{1-20}$ alkyl-OH can be optionally substituted 1-4 times with a substituent independently selected at each occurrence thereof from the group consisting of H, —OH, —$SO_3R^5$, —$P(O)(OR^5)_2$, —$N(R^5)_2$, —$N(R^5)_3{}^+Hal^-$, and

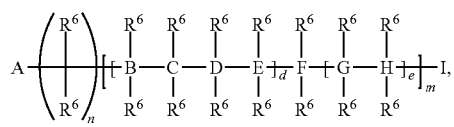

with the proviso that at least one of $R^1$, $R^2$, $R^3$, or $R^4$ is not hydrogen;
A and I are independently selected from the group consisting of a point of attachment (to formula (I) or $R^1$, $R^2$, $R^3$, or $R^4$),

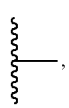

H, —$Si(R^6)_3$, $C_{1-20}$ alkyl,

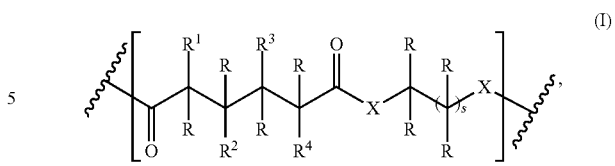

wherein
X is NH or O;
R is independently selected from the group consisting of H and $C_{1-20}$ alkyl;
$R^1$, $R^2$, $R^3$, and $R^4$ are independently selected from the group consisting of H, —U—$C_{1-1002}$ alkyl, —U—$C_{1-20}$ alkyl-OH, and

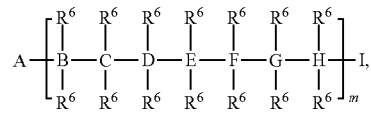

wherein each —U—$C_{1-1002}$ alkyl and —U—$C_{1-20}$ alkyl-OH can be optionally substituted 1-4 times with a substituent independently selected at each occurrence thereof from the group consisting of H, —OH, —$SO_3R^5$, —$P(O)(OR^5)_2$, —$N(R^5)_2$, —$N(R^5)_3^+Hal^-$, and

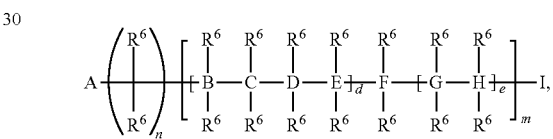

with the proviso that at least one of $R^1$, $R^2$, $R^3$, or $R^4$ is not hydrogen;
A and I are independently selected from the group consisting of a point of attachment (to formula (I) or $R^1$, $R^2$, $R^3$, or $R^4$),

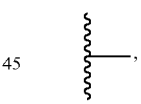

H, —$Si(R^6)_3$, $C_{1-20}$ alkyl,

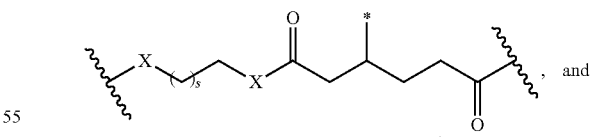

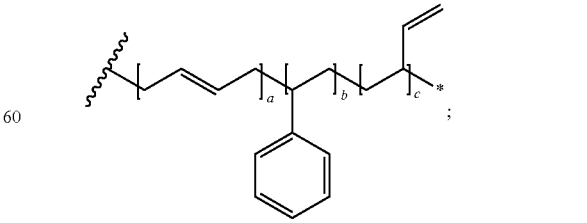

B, C, D, E, F, G, and H are independently selected from the group consisting of a bond, C, O, Si, N, or U;

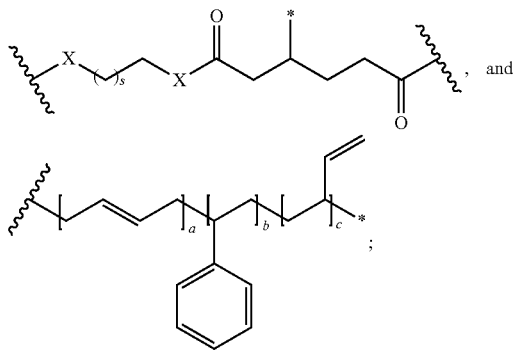

B, C, D, E, F, G, and H are independently selected from the group consisting of a bond, C, O, Si, N, or U;
$R^5$ is independently selected at each occurrence thereof from the group consisting of H, $C_{1-6}$ alkyl, and halogen;
$R^6$ is optional, and if present, is independently selected at each occurrence thereof from the group consisting of a point of attachment (to formula (I) or $R^1$, $R^2$, $R^3$, or $R^4$), H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —$N(R^7)_2$, —$C(O)R^7$, and —C(O)—X—$CH_2$—$(CH_2)_s$—$XR^7$;
$R^7$ is independently selected at each occurrence thereof from the group consisting of H, $C_{1-6}$ alkyl, and

U is optional and, if present, is —$(S)_p$—;
*— is a point of attachment to formula (I) or $R^1$, $R^2$, $R^3$, or $R^4$;

is a terminal group of the polymer;
a is 1-1,000,000;
b is 1-1,000,000;
c is 1-1,000,000;
d is 1-1,000,000;
e is 1-1,000,000;
m is 0 to 1,000,000;
n is 0 to 10;
p is 1 to 8; and
s is 1 to 50;
or a salt thereof.

Another aspect of the present invention relates to a polymer comprising a repeating group having the structure of formula (I):

$R^5$ is independently selected at each occurrence thereof from the group consisting of H, $C_{1-6}$ alkyl, and halogen;

$R^6$ is optional, and if present, is independently selected at each occurrence thereof from the group consisting of a point of attachment (to formula (I) or $R^1$, $R^2$, $R^3$, or $R^4$), H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —N($R^7$)$_2$, —C(O)$R^7$, and —C(O)—X—CH$_2$—(CH$_2$)$_s$—X$R^7$;

$R^7$ is independently selected at each occurrence thereof from the group consisting of H, $C_{1-6}$ alkyl, and

;

U is optional and, if present, is S;

*— is a point of attachment to formula (I) or $R^1$, $R^2$, $R^3$, or $R^4$;

is a terminal group of the polymer;

a is 1-1,000,000;
b is 1-1,000,000;
c is 1-1,000,000;
d is 1-1,000,000;
e is 1-1,000,000;
m is 0 to 1,000,000;
n is 0 to 10; and
s is 1 to 50;
or a salt thereof.

The repeating groups in the polymer of formula (I) can be the same or different.

Preferably, the repeating group is present in the polymer of formula (I) in an amount of 2 to 10,000,000.

As used above, and throughout the description herein, the following terms, unless otherwise indicated, shall be understood to have the following meanings. If not defined otherwise herein, all technical and scientific terms used herein have the same meaning as is commonly understood by one of ordinary skill in the art to which this technology belongs. In the event that there is a plurality of definitions for a term herein, those in this section prevail unless stated otherwise.

The term "alkyl" means an aliphatic hydrocarbon group which may be straight or branched having about 1 to about 1010 carbon atoms in the chain. Branched means that one or more lower alkyl groups such as methyl, ethyl or propyl are attached to a linear alkyl chain. Exemplary alkyl groups include methyl, ethyl, n-propyl, i-propyl, n-butyl, t-butyl, n-pentyl, and 3-pentyl.

The term "Hal" or "halogen" means fluoro, chloro, bromo, or iodo.

The term "substituted" or "substitution" of an atom means that one or more hydrogen on the designated atom is replaced with a selection from the indicated group, provided that the designated atom's normal valency is not exceeded. "Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture, and formulation into an efficacious therapeutic agent.

The term "optionally substituted" is used to indicate that a group may have a substituent at each substitutable atom of the group (including more than one substituent on a single atom), provided that the designated atom's normal valency is not exceeded and the identity of each substituent is independent of the others. Up to three H atoms in each residue are replaced with alkyl, halogen, haloalkyl, hydroxy, loweralkoxy, carboxy, carboalkoxy (also referred to as alkoxycarbonyl), carboxamido (also referred to as alkylaminocarbonyl), cyano, carbonyl, nitro, amino, alkylamino, dialkylamino, mercapto, alkylthio, sulfoxide, sulfone, acylamino, amidino, phenyl, benzyl, heteroaryl, phenoxy, benzyloxy, or heteroaryloxy. "Unsubstituted" atoms bear all of the hydrogen atoms dictated by their valency. When a substituent is keto (i.e., =O), then two hydrogens on the atom are replaced. Combinations of substituents and/or variables are permissible only if such combinations result in stable compounds; by "stable compound" or "stable structure" is meant a compound that is sufficiently robust to survive isolation to a useful degree of purity from a reaction mixture, and formulation into an efficacious therapeutic agent.

Compounds described herein may contain one or more asymmetric centers and may thus give rise to enantiomers, diastereomers, and other stereoisomeric forms. Each chiral center may be defined, in terms of absolute stereochemistry, as (R)— or (S)—. The present invention is meant to include all such possible isomers, as well as mixtures thereof, including racemic and optically pure forms. Optically active (R)- and (S)-, (−)- and (+)-, or (D)- and (L)-isomers may be prepared using chiral synthons or chiral reagents, or resolved using conventional techniques. When the compounds described herein contain olefinic double bonds or other centers of geometric asymmetry, and unless specified otherwise, it is intended that the compounds include both E and Z geometric isomers. Likewise, all tautomeric forms are also intended to be included.

One embodiment relates to the polymer of the present invention where the polymer has 2-10,000,000 repeating groups with the structure of formula (I).

Another embodiment relates to the polymer of the present invention where $R^1$, $R^2$, $R^3$, or $R^4$ is

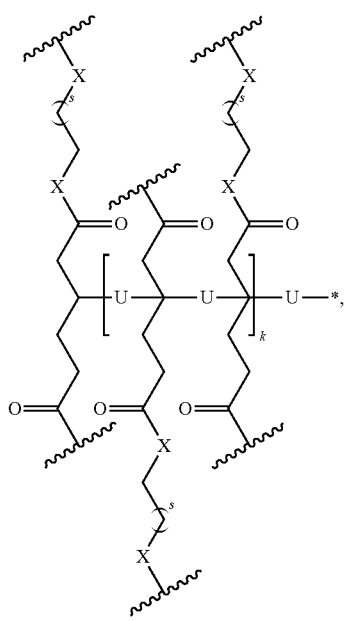

and k is 1 to 1,000,000.

Yet another embodiment relates to the polymer of the present invention where $R^1$, $R^2$, $R^3$, or $R^4$ is

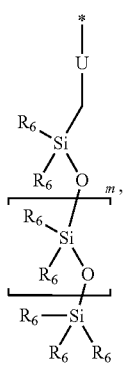

and m is 1 to 999,999.

Another embodiment relates to the polymer of the present invention where $R^1$, $R^2$, $R^3$, or $R^4$ is

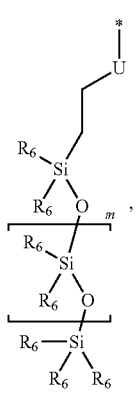

and m is 1 to 999,999.

Yet another embodiment relates to the polymer of the present invention where $R^1$, $R^2$, $R^3$, or $R^4$ is

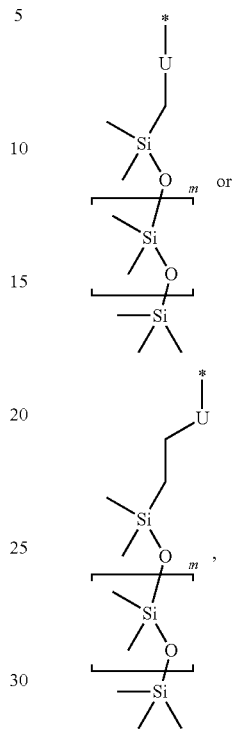

and m is 2 to 1000.

A further embodiment relates to the polymer of the present invention where $R^1$, $R^2$, $R^3$, or $R^4$ is

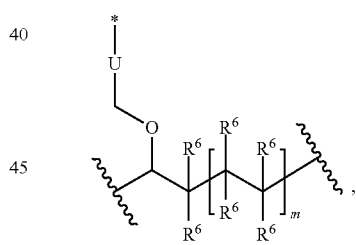

and m is 1 to 1,000,000.

Another embodiment relates to the polymer of the present invention where $R^1$, $R^2$, $R^3$, or $R^4$ is

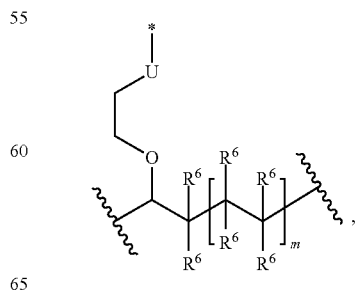

and m is 1 to 1,000,000.

Another embodiment relates to the polymer of the present invention where $R^1$, $R^2$, $R^3$, or $R^4$ is

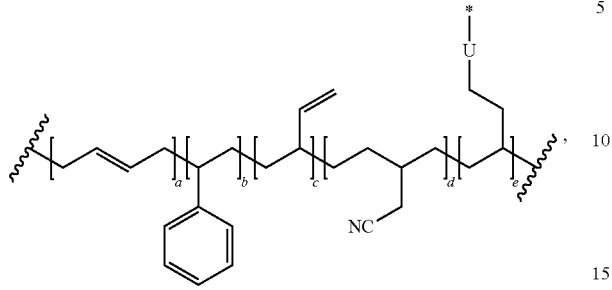

a is 1-1,000,000, b is 1-1,000,000, c is 1-1,000,000, d is 1-1,000,000, and e is 1-1,000,000.

In one embodiment, the repeating group of the polymer has the structure of formula (Ia):

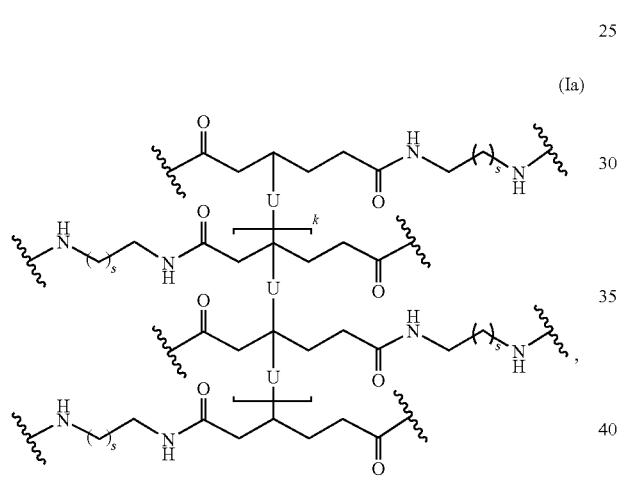

s is 1-50, and k is 1 to 1,000,000.

In another embodiment, the repeating group of the polymer has the structure of formula (Ib):

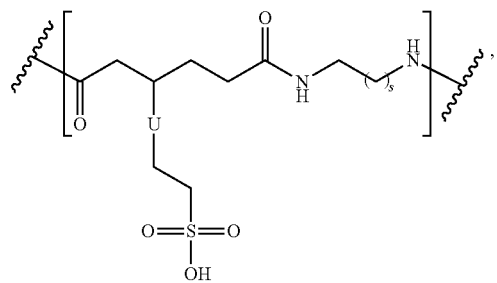

and s is 1-50.

In another embodiment, the repeating group of the polymer has the structure of formula (Ib'):

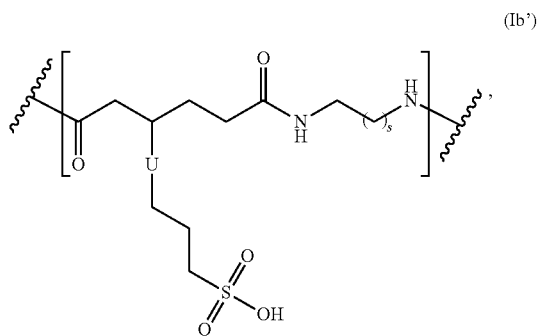

and s is 1-50.

In yet another embodiment, the repeating group of the polymer has the structure of formula (Ic):

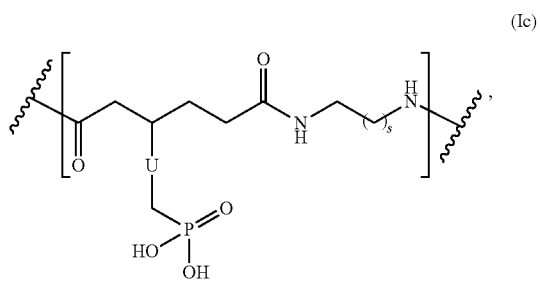

and s is 1-50.

In yet another embodiment, the repeating group of the polymer has the structure of formula (Ic'):

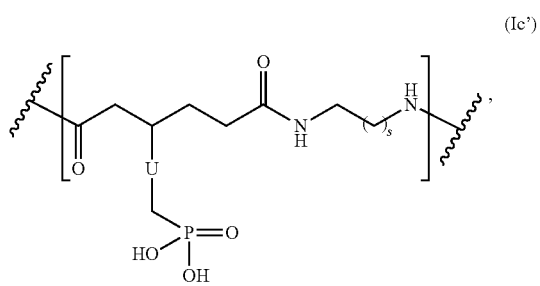

and s is 1-50.

In yet another embodiment, the repeating group of the polymer has the structure of formula (Id):

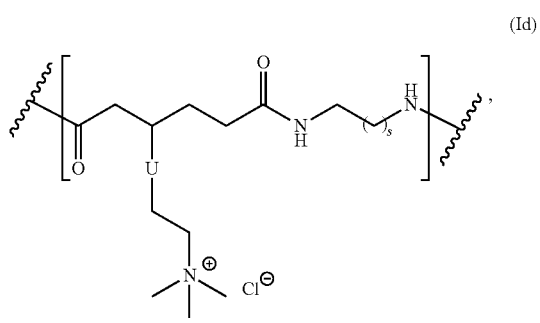

and s is 1-50.

In yet another embodiment, the repeating group of the polymer has the structure of formula (Id'):

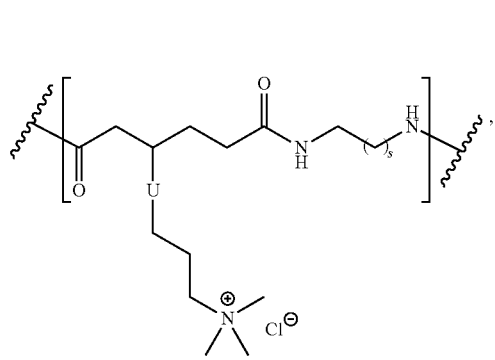

and s is 1-50.

In a further embodiment, the repeating group of the polymer has the structure of formula (Ie):

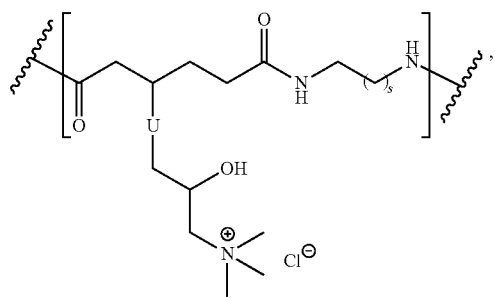

and s is 1-50.

In a further embodiment, the repeating group of the polymer has the structure of formula (Ie'):

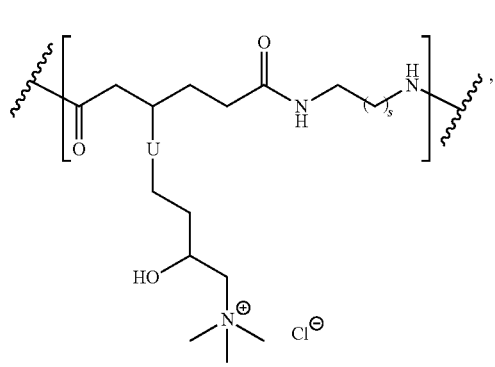

and s is 1-50.

In another embodiment, the repeating group of the polymer has the structure of formula (If):

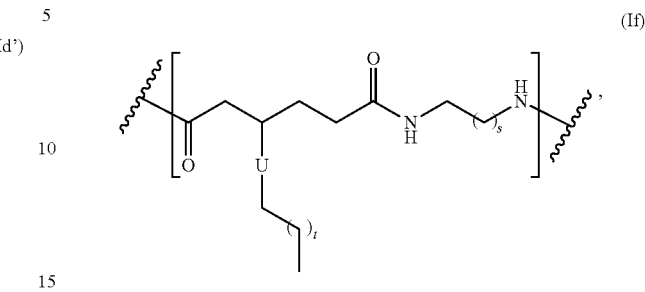

and s is 1-50, and t is 2-1000.

In another embodiment, the repeating group of the polymer has the structure of formula (Ig):

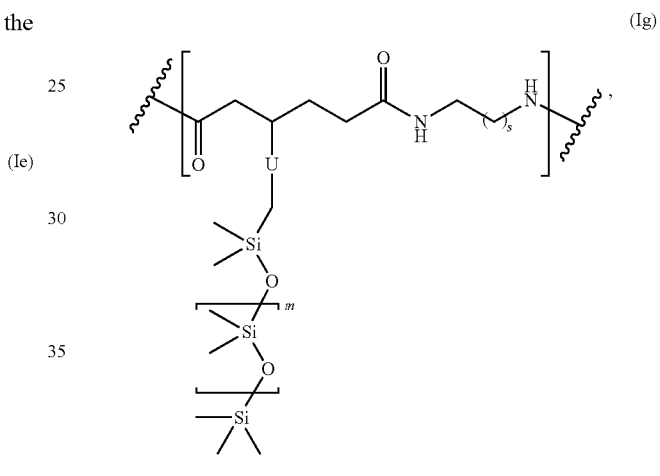

and s is 1-50, and m is 2-1000.

In another embodiment, the repeating group of the polymer has the structure of formula (Ig'):

and s is 1-50, and m is 2-1000

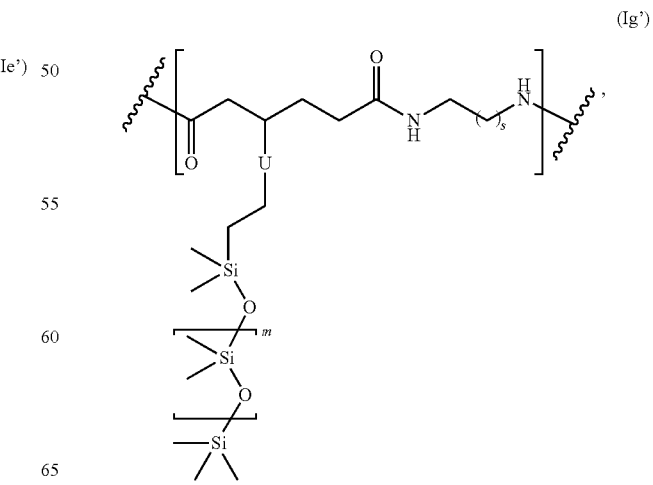

In another embodiment, the repeating group of the polymer has the structure of formula (Ih):

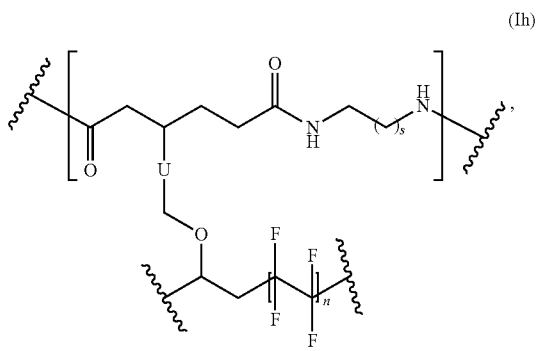

(Ih)

s is 1-50, and m is 2-1000.

In another embodiment, the repeating group of the polymer has the structure of formula (Ih'):

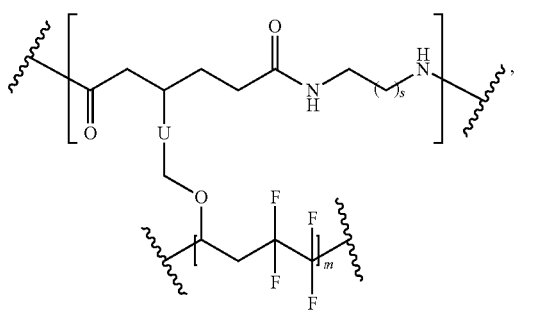

(Ih')

s is 1-50, and m is 2-1000.

In a further embodiment, the repeating group of the polymer has the structure of formula (Ii):

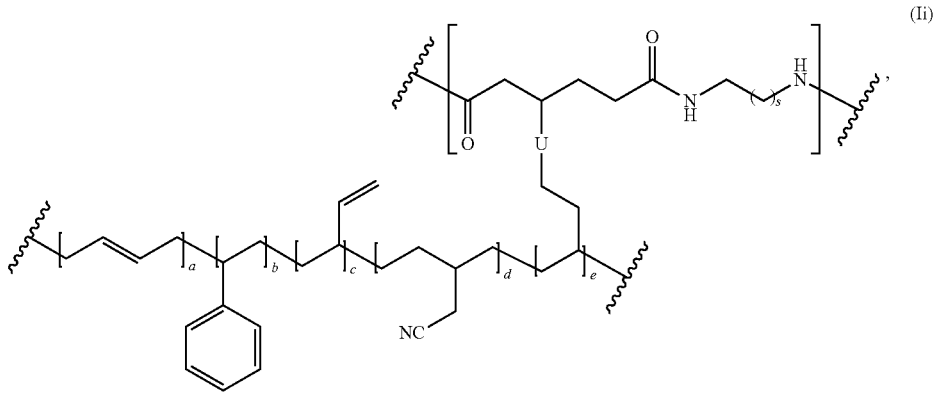

(Ii)

a is 1-1,000,000, b is 1-1,000,000, c is 1-1,000,000, d is 1-1,000,000, e is 1-1,000,000, and s is 1-50.

Another aspect of the present invention relates to a process for preparation of a polymer comprising a repeating group having the structure of formula (I):

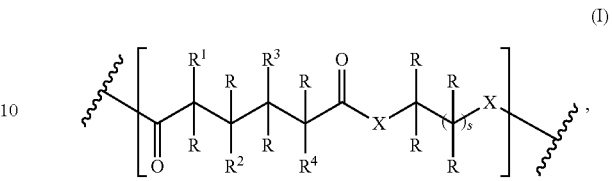

(I)

wherein

X is NH or O;

R is independently selected from the group consisting of H and $C_{1-20}$ alkyl;

$R^1$, $R^2$, $R^3$, and $R^4$ are independently selected from the group consisting of H, —U—$C_{1-1002}$ alkyl, —U—$C_{1-20}$ alkyl-OH, and

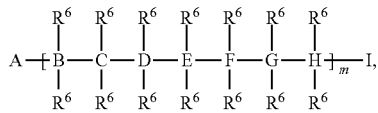

wherein each —U—$C_{1-1002}$ alkyl and —U—$C_{1-20}$ alkyl-OH can be optionally substituted 1-4 times with a substituent independently selected at each occurrence thereof from the group consisting of H, —OH, —$SO_3R^5$, —$P(O)(OR^5)_2$, —$N(R^5)_2$, —$N(R^5)_3{}^+Hal^-$, and

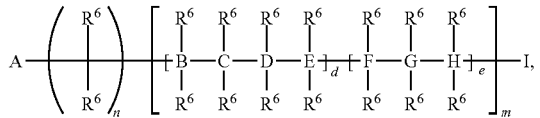

with the proviso that at least one of $R^1$, $R^2$, $R^3$, or $R^4$ is not hydrogen;

A and I are independently selected from the group consisting of a point of attachment (to formula (I) or $R^1$, $R^2$, $R^3$, or $R^4$),

H, —Si($R^6$)$_3$, $C_{1-20}$ alkyl,

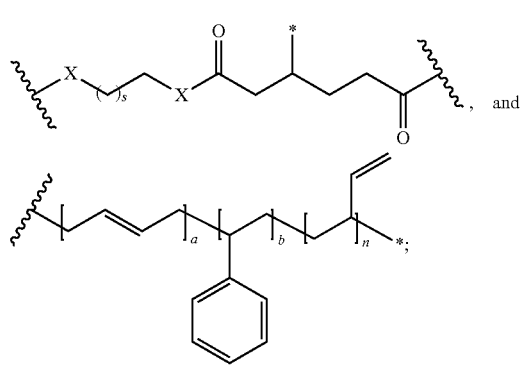
and

B, C, D, E, F, G, and H are independently selected from the group consisting of a bond, C, O, Si, N, or U;

$R^5$ is independently selected at each occurrence thereof from the group consisting of H, $C_{1-6}$ alkyl, and halogen;

$R^6$ is optional, and if present, is independently selected at each occurrence thereof from the group consisting of a point of attachment (to formula (I) or $R^1$, $R^2$, $R^3$, or $R^4$), H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —N($R^7$)$_2$, —C(O)$R^7$, and —C(O)—X—CH$_2$—(CH$_2$)$_s$—XR$^7$;

$R^7$ is independently selected at each occurrence thereof from the group consisting of H, $C_{1-6}$ alkyl, and

U is optional and, if present, is —(S)$_p$—;

* — is a point of attachment to formula (I) or $R^1$, $R^2$, $R^3$, or $R^4$;

is a terminal group of the polymer;
a is 1-1,000,000;
b is 1-1,000,000;
c is 1-1,000,000;
d is 1-1,000,000;
e is 1-1,000,000;
m is 0 to 1,000,000;
n is 0 to 10;
p is 1 to 8; and
s is 1 to 50;
or a salt thereof.

This process includes:
providing a first intermediate polymeric compound comprising a repeating group having the structure of formula (II):

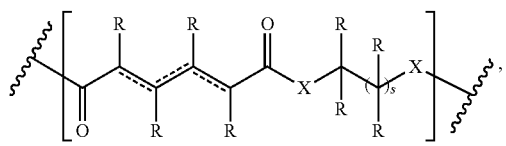
(II)

wherein each ═══ is independently a single or a double bond with no adjacent double bonds, and wherein at least one ═══ is a double bond; and forming the polymer comprising a repeating group having the structure of formula (I) from the first intermediate polymeric compound comprising a repeating group having the structure of formula (II).

Another aspect of the present invention relates to a process for preparation of a polymer comprising a repeating group having the structure of formula (I):

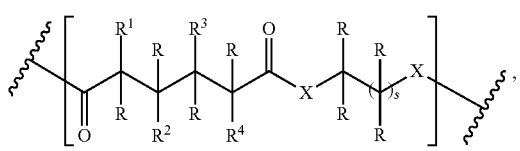
(I)

wherein
X is NH or O;
R is independently selected from the group consisting of H and $C_{1-20}$ alkyl;
$R^1$, $R^2$, $R^3$, and $R^4$ are independently selected from the group consisting of H, —U—$C_{1-1002}$ alkyl, —U—$C_{1-20}$ alkyl-OH, and

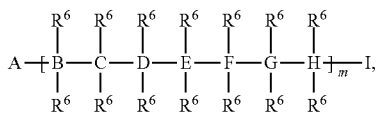

wherein each —U—$C_{1-1002}$ alkyl and —U—$C_{1-20}$ alkyl-OH can be optionally substituted 1-4 times with a substituent independently selected at each occurrence thereof from the group consisting of H, —OH, —SO$_3$R$^5$, —P(O)(OR$^5$)$_2$, —N($R^5$)$_2$, —N($R^5$)$_3$$^+$Hal$^-$, and

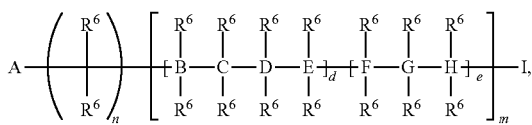

with the proviso that at least one of $R^1$, $R^2$, $R^3$, or $R^4$ is not hydrogen;

A and I are independently selected from the group consisting of a point of attachment (to formula (I) or $R^1$, $R^2$, $R^3$, or $R^4$),

H, —Si($R^6$)$_3$, $C_{1-20}$ alkyl,

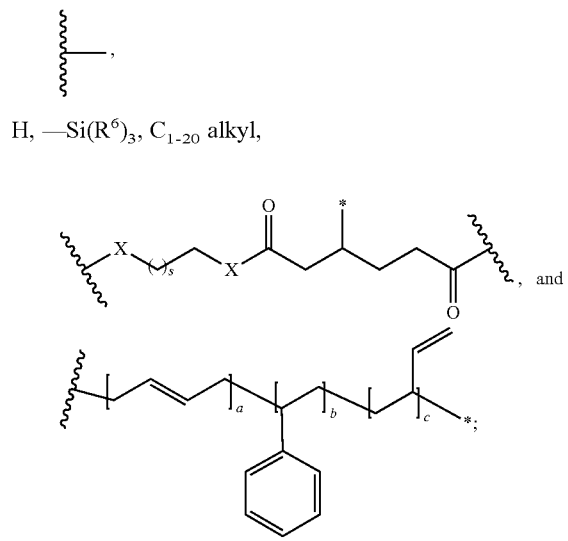

B, C, D, E, F, G, and H are independently selected from the group consisting of a bond, C, O, Si, N, or U;

$R^5$ is independently selected at each occurrence thereof from the group consisting of H, $C_{1-6}$ alkyl, and halogen;

$R^6$ is optional, and if present, is independently selected at each occurrence thereof from the group consisting of a point of attachment (to formula (I) or $R^1$, $R^2$, $R^3$, or $R^4$), H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —N($R^7$)$_2$, —C(O)$R^7$, and —C(O)—X—CH$_2$—(CH$_2$)$_s$—XR$^7$;

$R^7$ is independently selected at each occurrence thereof from the group consisting of H, $C_{1-6}$ alkyl, and

U is optional and, if present, is S;

*— is a point of attachment to formula (I) or $R^1$, $R^2$, $R^3$, or $R^4$;

is a terminal group of the polymer;
a is 1-1,000,000;
b is 1-1,000,000;
c is 1-1,000,000;
d is 1-1,000,000;
e is 1-1,000,000;
m is 0 to 1,000,000;
n is 0 to 10; and
s is 1 to 50;
or a salt thereof.

This process includes:
providing a first intermediate polymeric compound comprising a repeating group having the structure of formula (II):

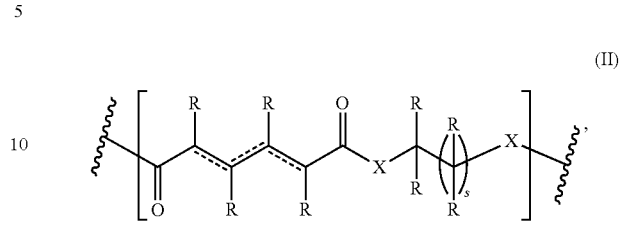

wherein each $===$ is independently a single or a double bond with no adjacent double bonds, and wherein at least one $===$ is a double bond; and forming the polymer comprising a repeating group having the structure of formula (I) from the first intermediate polymeric compound comprising a repeating group having the structure of formula (II).

The repeating groups in the polymer of formula (I) can be the same or different.

According to the present invention, a polymer comprising a repeating group having the structure of formula (I) may include polymers where some of the repeating units have a chemical structure like that of formula (I) but have a double bond resulting from incomplete conversion of the double bond in the structure of formula (II). That unconverted double bond would correspond to what is identified in the structure of formula (II) by $===$.

Polymers of the present invention can be prepared according to the schemes described below. Polymer of formula 3 can be prepared by initial polycondensation reaction (oligomer formation) between acid 1 and compound of formula 2 (Scheme 1) followed by post polymerization step (polymer formation). Acid 1 can be a diacid or a mixture of different acids. The initial polycondensation reaction (oligomer formation) can be performed in a variety of solvents, for example in water, methanol (MeOH), ethanol (EtOH), isopropanol (i-PrOH), dimethylformamide (DMF), or other such solvents or in the mixture of such solvents. The initial polycondensation reaction (oligomer formation) can be carried out at a temperature of 0° C. to 150° C., at a temperature of 40° C. to 90° C., or at a temperature of 50° C. to 70° C. The polymer formation step can be performed in a variety of solvents, for example in phenols, cresols, hexafluoro-isopropanol, dimethylformamide (DMF) or other such solvents or in the mixture of such solvents. The final step in the polymerization (polymer formation) reaction can be carried out at a temperature of 20° C. to 400° C., at a temperature of 100° C. to 300° C., or at a temperature of 200° C. to 300° C.

Scheme 1.

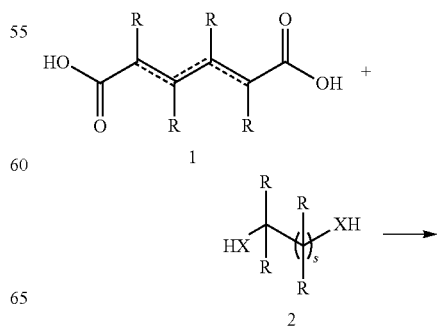

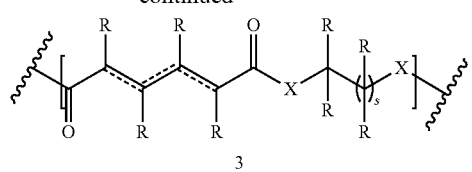

3

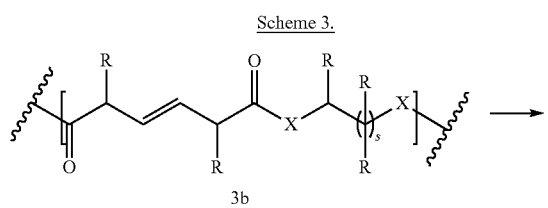

3b

Bioadvantaged nylon-6,6 is one of the examples of polymer of formula 3. Bioadvantaged nylon-6,6 (3a) can be prepared by an initial polycondensation reaction (oligomer formation) between 3-hexenedioic acid (HDA) (1a) and hexamethylenediamine (HMDA) (2a) (Scheme 2) followed by post polymerization step (polymer formation). 3-Hexenedioic acid (HDA) (1a) can be used alone or in combination with other acid. For example, a mixture of 3-hexenedioic acid and adipic acid can be used in this reaction. The initial polycondensation reaction (oligomer formation) can be performed in a variety of solvents, for example in water, methanol (MeOH), ethanol (EtOH), isopropanol (i-PrOH), dimethylformamide (DMF), or other such solvents or in the mixture of such solvents. The initial polycondensation reaction (oligomer formation) can be carried out at a temperature of 0° C. to 150° C., at a temperature of 40° C. to 90° C., or at a temperature of 50° C. to 70° C.

The polymer formation step can be performed in a variety of solvents, for example in phenols, cresols, hexafluoroisopropanol, dimethylformamide (DMF) or other such solvents or in the mixture of such solvents. The final step in the polymerization (polymer formation) reaction can be carried out at a temperature of 20° C. to 400° C., at a temperature of 100° C. to 300° C., or at a temperature of 200° C. to 300° C.

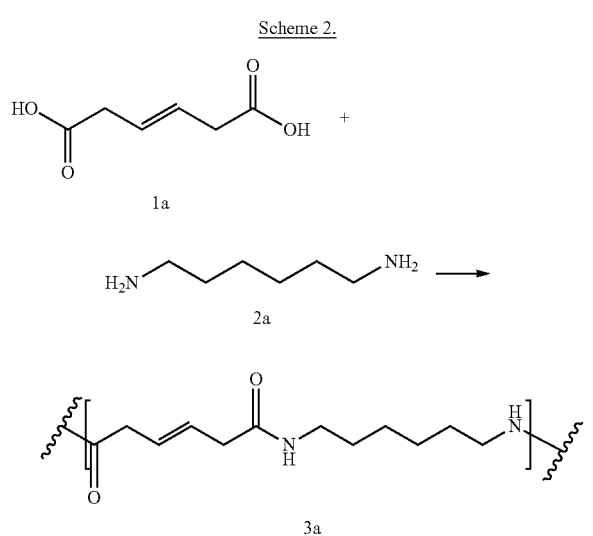

Scheme 2.

1a

2a

3a

Crosslinking of the polymer improves elongation (Scheme 3). Crosslinking using elemental sulfur results in formation of C—S—C linkages (U is S). Alternatively, crosslinking can be performed by using free radical mechanism (i.e., in the presence of peroxides, epoxies, or under UV light, heat, or ultrasound), in this case U is absent.

Crosslinking of the bioadvantaged nylon (3a) using elemental sulfur is shown in Scheme 4. The crosslinking reaction can be performed in a variety of solvents, for example in phenols, cresols, hexafluoro-isopropanol, dimethylformamide (DMF), or other such solvents or in the mixture of such solvents. The crosslinking reaction can also be performed without the solvent. The crosslinking reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

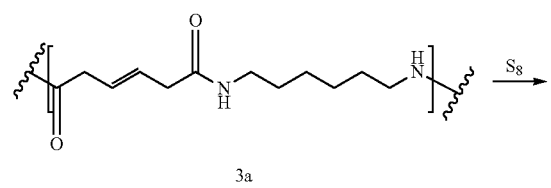

Scheme 4.

3a

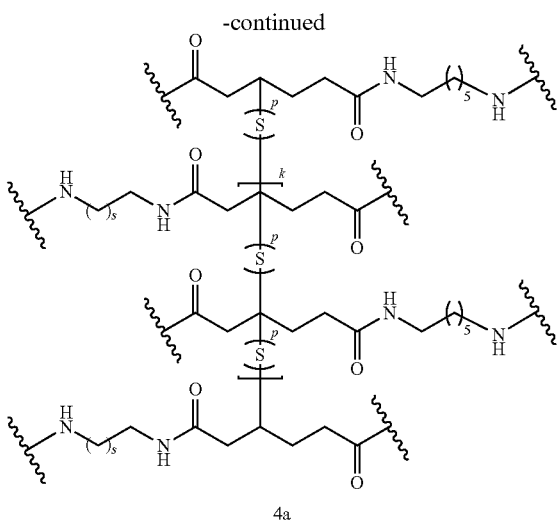

4a

Scheme 5 shows crosslinking of the bioadvantaged nylon (3a) by free radical mechanism. The crosslinking reaction can be performed in a variety of solvents, for example in phenols, cresols, hexafluoro-isopropanol, dimethylformamide (DMF), or other such solvents or in the mixture of such solvents. The crosslinking reaction can also be performed without the solvent. The crosslinking reaction can be carried out at a temperature of 0° C. to 400° C., at a temperature of 100° C. to 250° C., or at a temperature of 150° C. to 200° C.

Scheme 5.

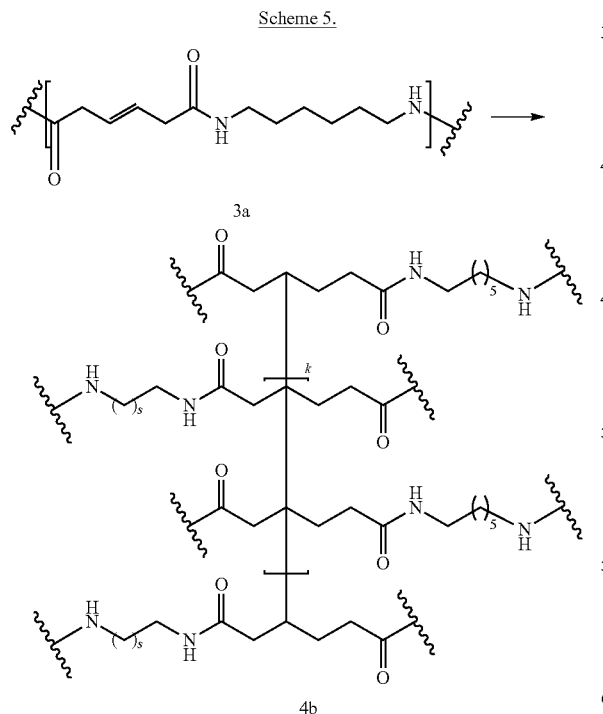

Polymer 3b can be modified by using the unsaturated double bond to attach different chemical groups (Scheme 6). Polymer 3b can be reacted with various compounds containing double bonds, such as alkenes and their sulfonic acid derivatives, phosphonic acid derivatives, amine derivatives, as well as various polymers containing double bonds in their side chain. These modifications can add properties like flame resistance, stain resistance, antistatic behavior, and reduced hygroscopicity.

Polymer 6 can be prepared by the reaction of compound 5 with polymer 3b. If this reaction is carried out in the presence of elemental sulfur, C—S—C linkages are formed (U is S). Alternatively, the reaction can be performed in the presence of peroxides, epoxies, or under UV light, heat, or ultrasound (free radical mechanism), in this case U is absent.

Scheme 6.

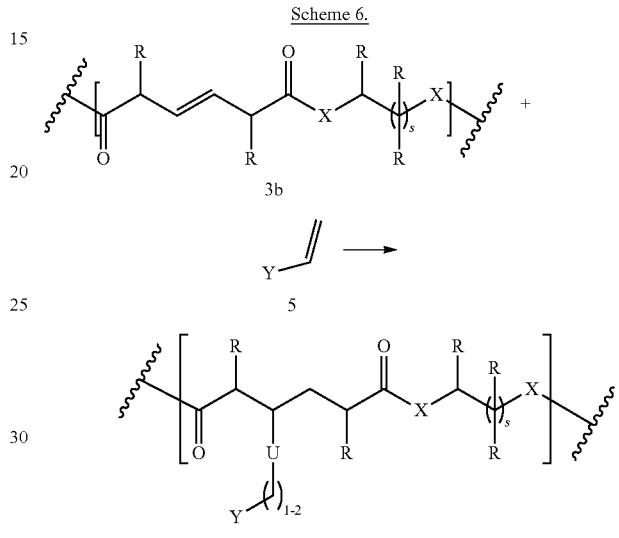

Introduction of phosphonic and/or phosphinic acid groups adds flame/stain resistance (Schemes 7-8). Reaction between bioadvantaged nylon (3a) and 2-propene-1-sulfonic acid (5a) in the presence of elemental sulfur is shown in Scheme 7. The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

Scheme 7.

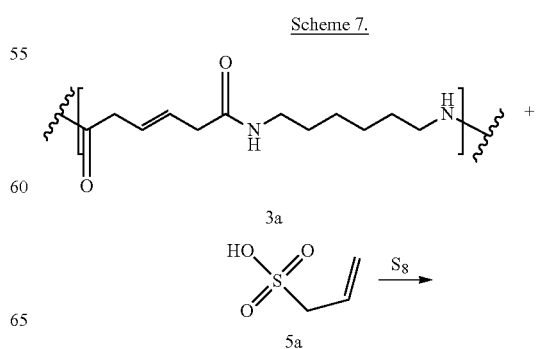

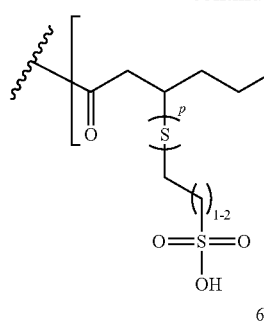

6a

Scheme 8 shows free radical reaction between bioadvantaged nylon (3a) and 2-propene-1-sulfonic acid (5a). The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C.

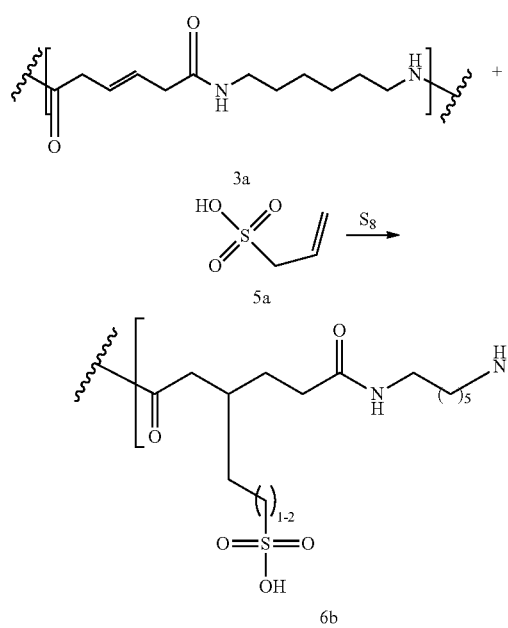

Phosphonic and/or phosphinic acid groups add flame/strain resistance. Reaction between bioadvantaged nylon (3a) and vinylphosphonic acid (5b) in the presence of elemental sulfur is shown in Scheme 9. The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

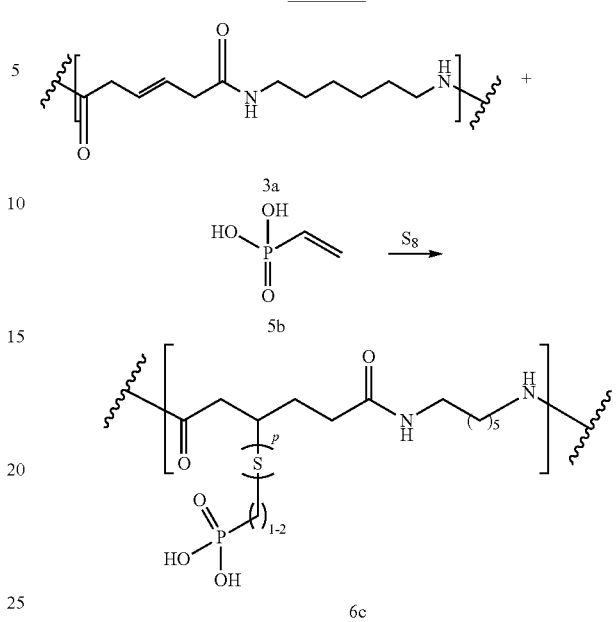

Scheme 10 shows free radical reaction between bioadvantaged nylon (3a) and vinylphosphonic acid (5b). The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C.

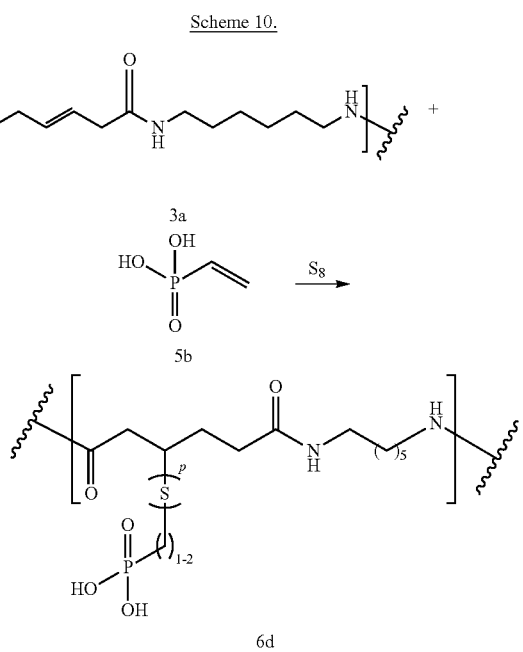

Introduction of quaternary ammonium salts adds antistatic behavior. Reaction between bioadvantaged nylon (3a) and allyl trimethyl ammonium chloride (5c) in the presence of elemental sulfur is shown in Scheme 11. The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

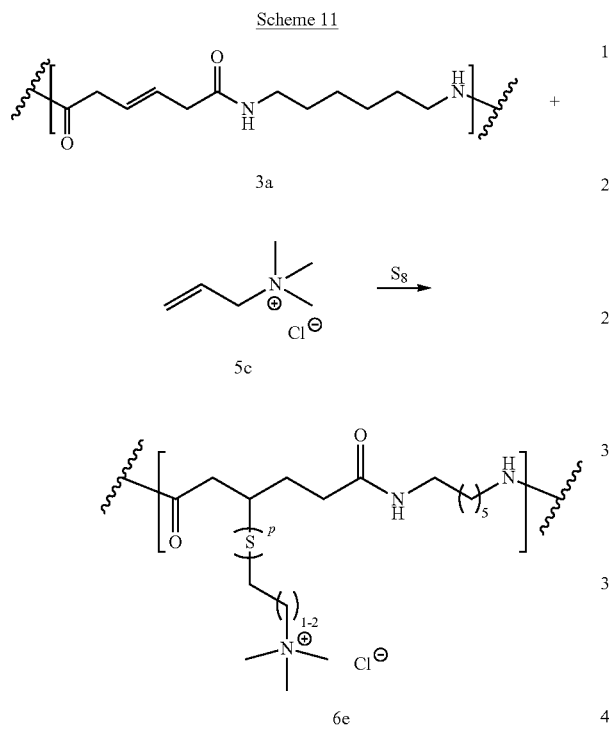

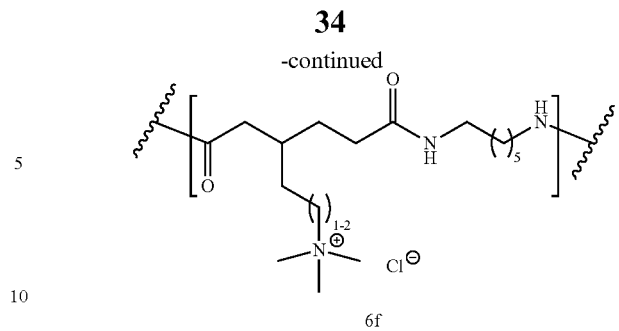

Polymer 8 can be prepared by the reaction of compound 7 with polymer 3b (Scheme 13). If this reaction is carried out in the presence of elemental sulfur, C—S—C linkages are formed (U is S). Alternatively, the reaction can be performed in the presence of peroxides, or under UV light, heat, or ultrasound (free radical mechanism), in this case U is absent.

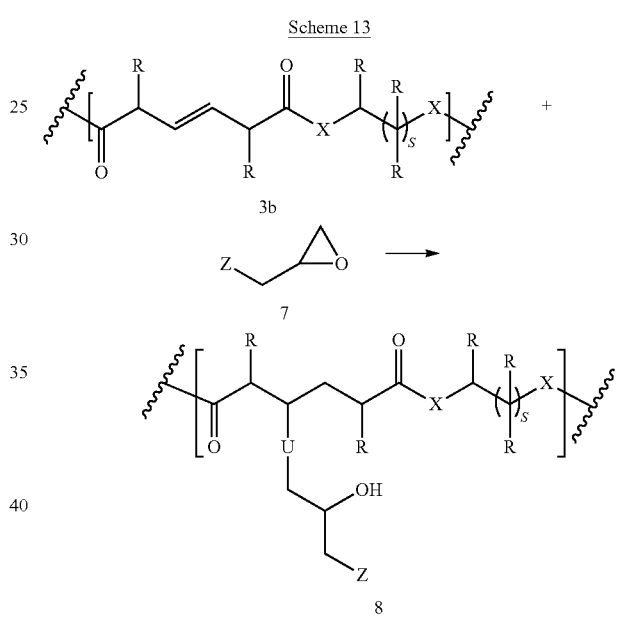

Scheme 12 shows free radical reaction between bioadvantaged nylon (3a) and allyl trimethyl ammonium chloride (5c). The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C.

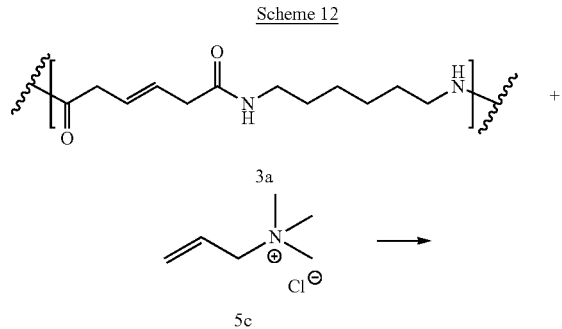

Schemes 14-15 show reaction of bioadvantaged nylon-6,6 (3a) with glycidyl trimethylammonium (7a). The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

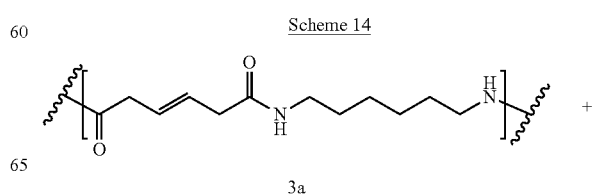

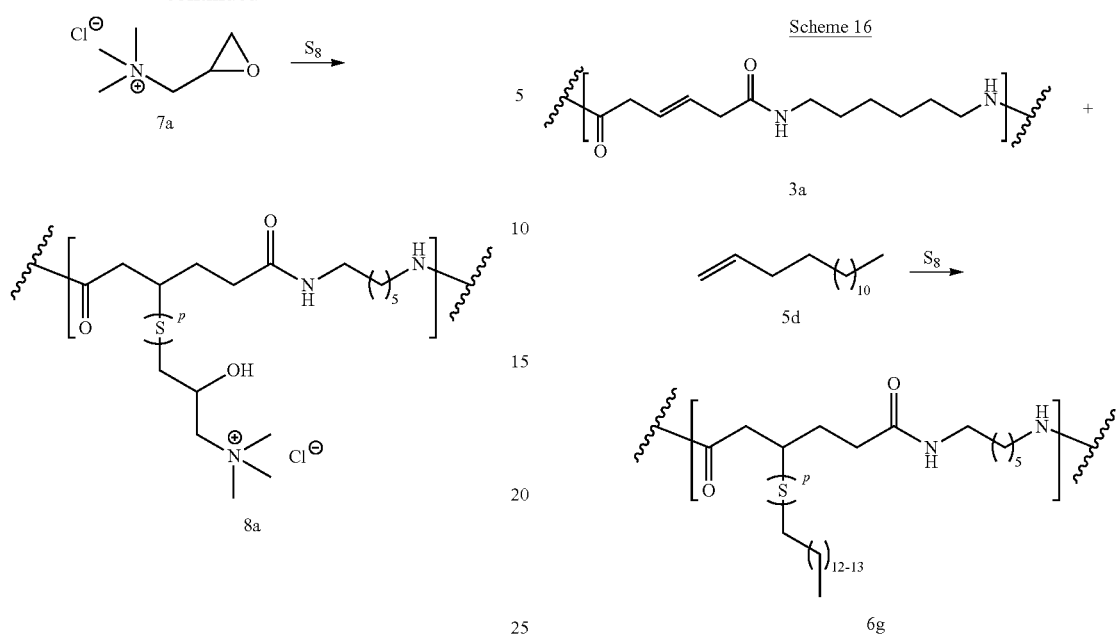

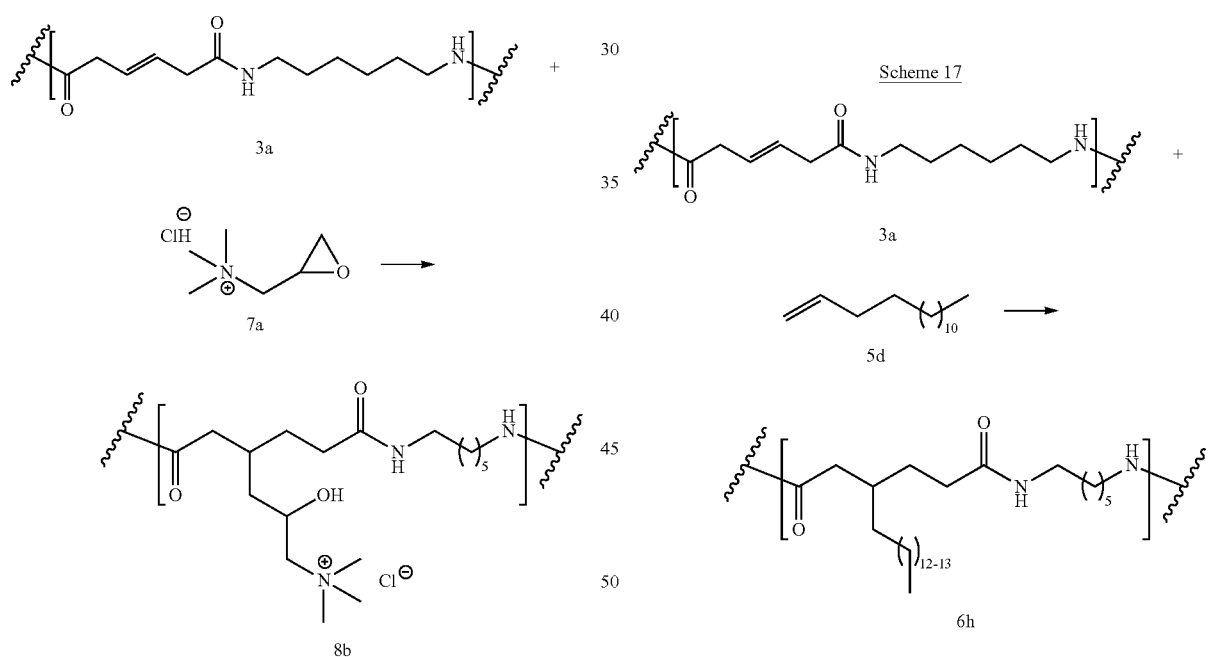

Introduction of long hydrocarbon groups adds hydrophobicity and soil resistance. Schemes 16-17 show reaction of bioadvantaged nylon-6,6 (3a) with pentadec-1-ene (5d). The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

Polysiloxanes/fluorocarbons can be used as softening agents or for surface lubrication. Schemes 18-19 show reaction of bioadvantaged nylon-6,6 (3a) with monovinyl terminated polydimethyl siloxane (5e). The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

Scheme 18

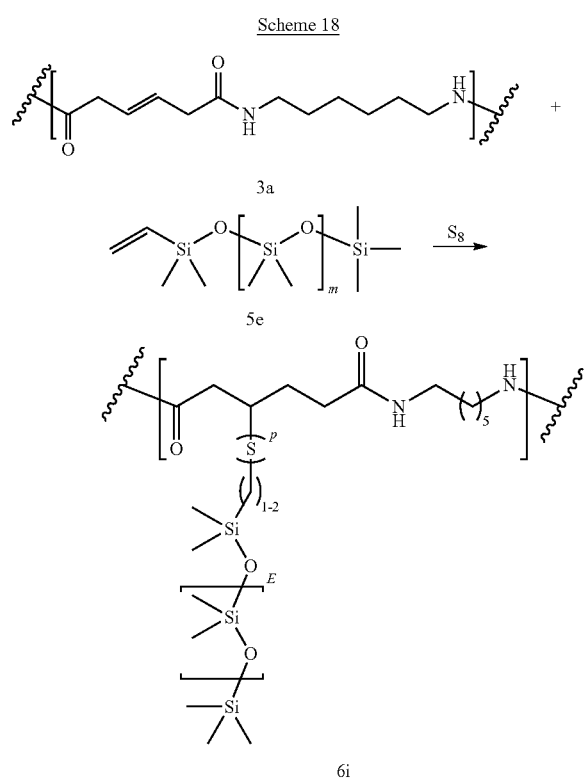

Scheme 19

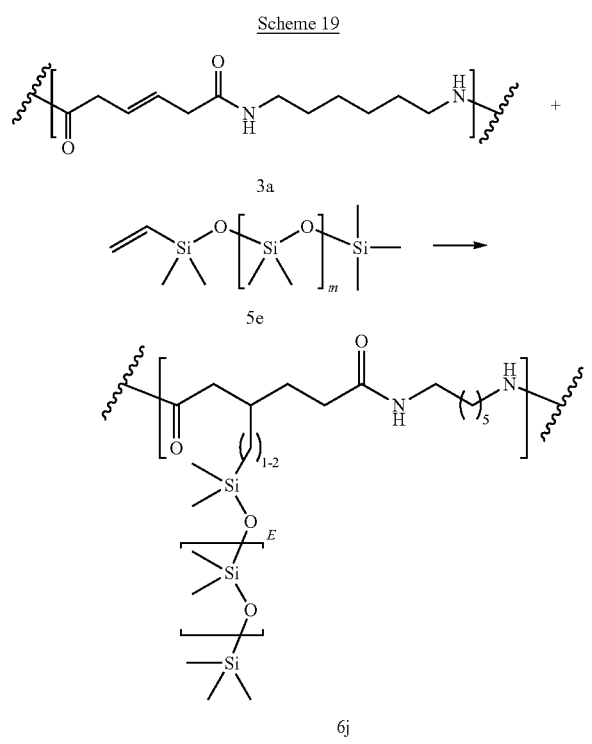

propanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

Scheme 20

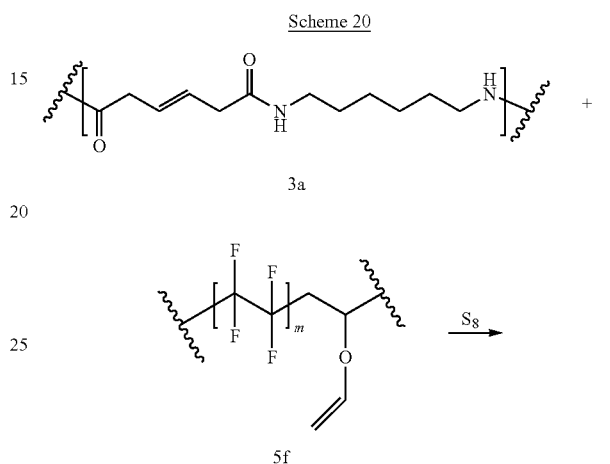

Scheme 21

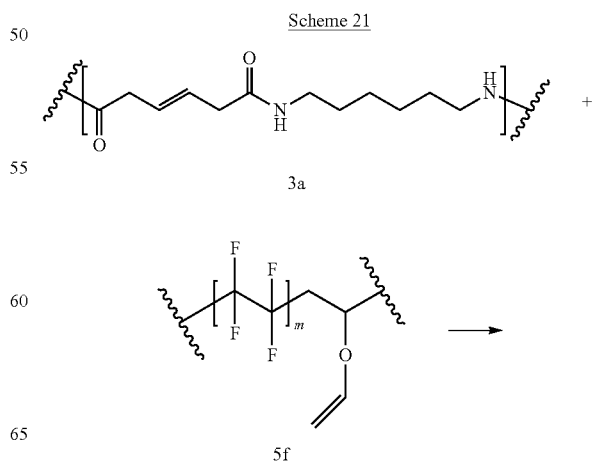

Schemes 20-21 show reaction between bioadvantaged nylon-6,6 (3a) and fluoroethylene alkyl vinyl ether (Lumiflon) (51). The reaction can be performed in a variety of solvents, for example in phenols, cresols, hexafluoro-iso- -continued

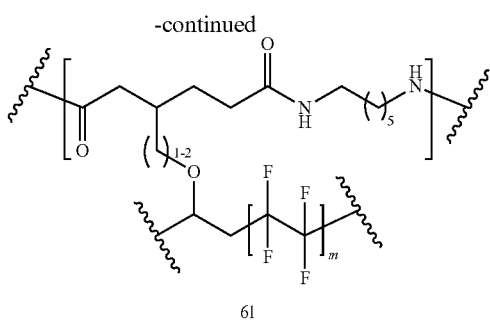

61

Addition of other polymers leads to toughening. Schemes 22-23 show reaction between bioadvantaged nylon-6,6 (3a) and ABS (5g). The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

Scheme 22

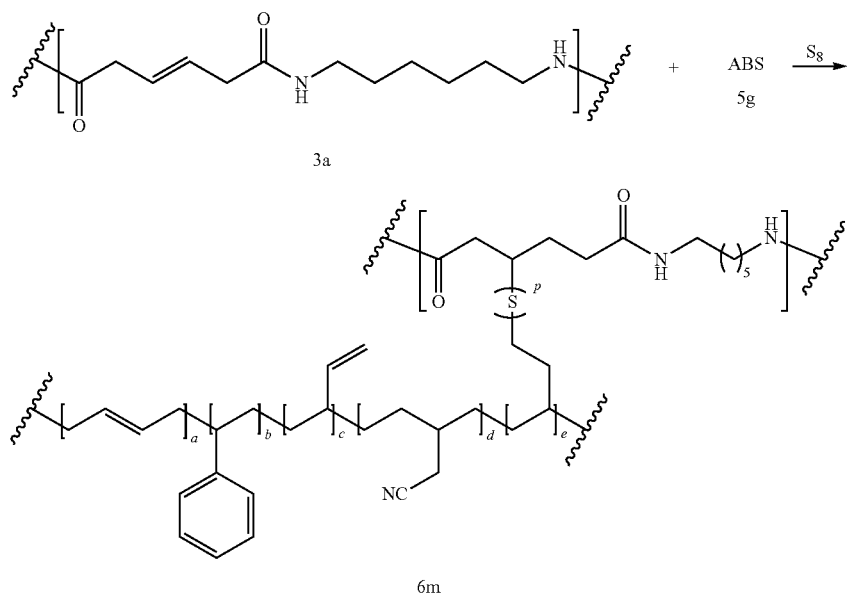

Scheme 23

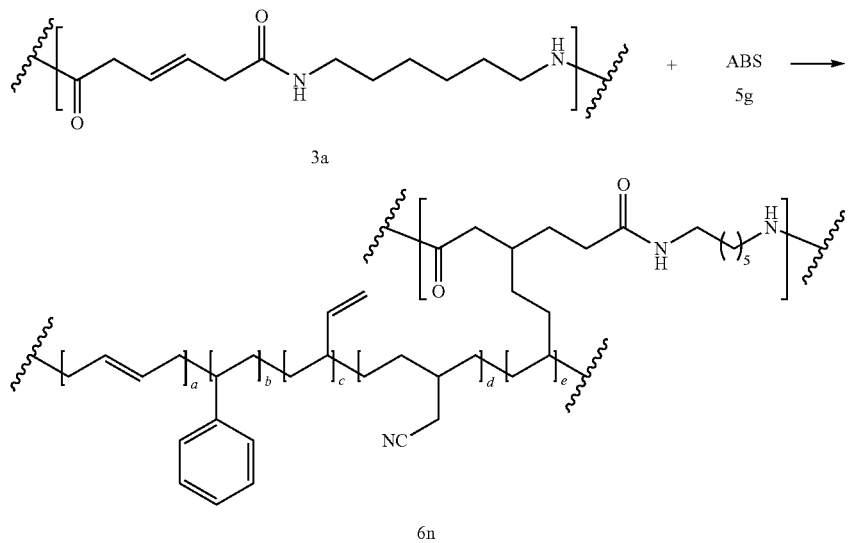

Schemes 24-25 show reaction between bioadvantaged nylon-6,6 (3a) and Styrene-Butadiene-Syrene (SBS) (5h). The reaction can be performed in a variety of solvents, for example in phenols, cresols, hexafluoro-isopropanol, dimethylformamide (DMF), or other such solvents or in the mixture of such solvents. The reaction can also be performed without the solvent. The reaction can be carried out at a temperature of 0° C. to 400° C., at a temperature of 100° C. to 250° C., or at a temperature of 150° C. to 200° C. Sulfur can be present at a concentration of 0.1-10%, at a concentration of 0.5-5%, or at a concentration of 0.5-3%.

Scheme 24

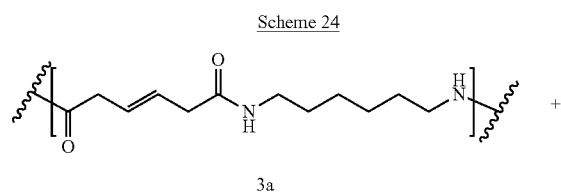

3a

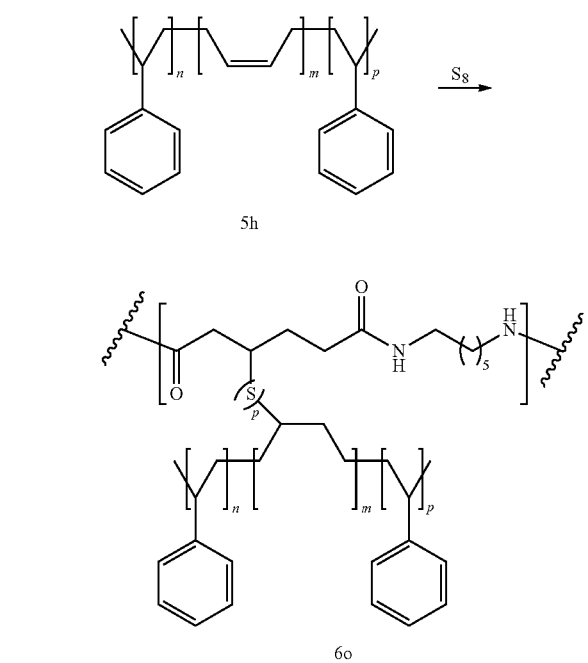

6o

Scheme 25

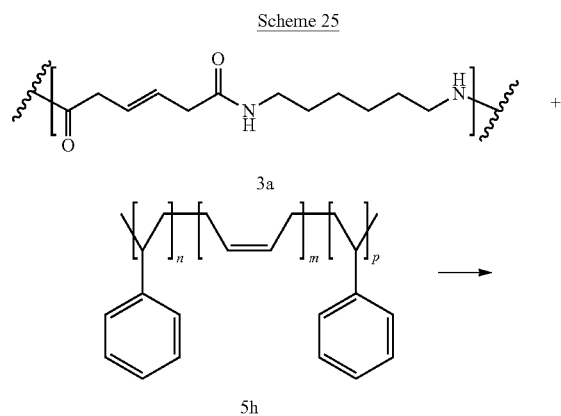

5h

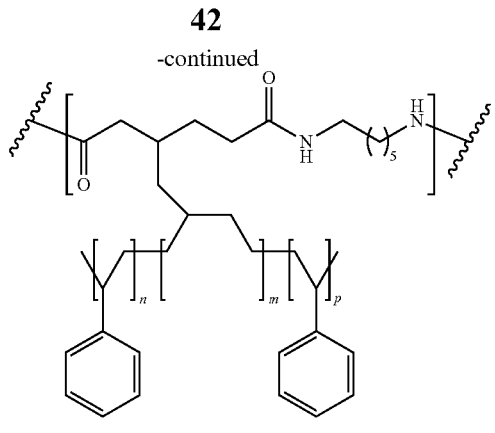

6p

In one embodiment, the process further includes providing a second intermediate compound of formula (III):

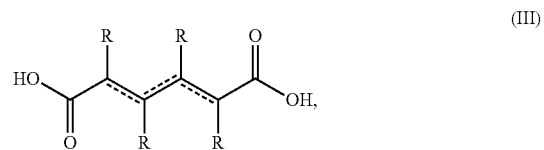

wherein each $=\!=\!=$ is independently a single or a double bond with no adjacent double bonds, and wherein at least one $=\!=\!=$ is a double bond; and forming the first intermediate polymeric compound from the second intermediate compound.

In another embodiment, the second intermediate compound of formula (III) is provided as a blend of hexenedioic acid (HDA)/adipic acid. Both 2-hexenedioic acid and 3-hexenedioic acid and their cis and trans isomers can be used in accordance with the present invention. In a preferred embodiment, trans 3-hexenedioic acid is used. In another embodiment, the process further includes providing muconic acid and forming the second intermediate compound from the muconic acid. In accordance with the present invention, forming is carried out by electrocatalytic hydrogenation of the muconic acid, as described in International Patent Application Publication No. WO 2016/077361 to Tessonnier et al., which is hereby incorporated by reference in its entirety. In particular, 3-hexene-1,6-dioic acid, 2-hexene-1,6-dioic acid, adipic acid, or a combination thereof can be prepared from muconic acid by an electrocatalytic method (International Patent Application Publication No. WO 2016/077361 to Tessonnier et al., which is hereby incorporated by reference in its entirety). This method can include passing current through a catalytic cathode in a reactor including an aqueous acidic solution of muconic acid, a supporting electrolyte, and an anode, so as to generate atomic hydrogen on the cathode surface in an amount effective to hydrogenate the muconic acid to yield a product including 3-hexene-1,6-dioic acid, 2-hexene-1,6-dioic acid, adipic acid, or a mixture thereof (International Patent Application Publication No. WO 2016/077361 to Tessonnier et al., which is hereby incorporated by reference in its entirety).

In another embodiment, the process further includes providing glucose and forming muconic acid from the glucose. In accordance with the present invention, forming is carried out by fermenting the glucose, as described in the U.S.

Provisional Patent Application No. 62/253,432 to Shao et al., which is hereby incorporated by reference in its entirety. In particular, an isolated yeast strain, the genome of which is augmented with a recombinant DNA construct comprising a nucleic acid sequence encoding a multifunctional ARO1 variant with the DHS/shikimate dehydrogenase subunit having an amino acid residue at position 1409 that is not D (aspartic acid) or is not glutamic acid (E) which variant has decreased activity or lacks activity relative to an pentafunctional ARO1 having an amino acid residue at position 1409 that is D or E, which strain exogenously expresses one or more enzymes that catalyze the production of MA from dehydroshikimate acid, in a fermentation medium; can be incubated in the medium under controlled temperature and dissolved limited oxygen conditions, to yield a composition comprising muconic acid (U.S. Provisional Patent Application No. 62/253,432 to Shao et al., which is hereby incorporated by reference in its entirety).

Example 2—Size Exclusion Chromatography (SEC)

Figure 2:
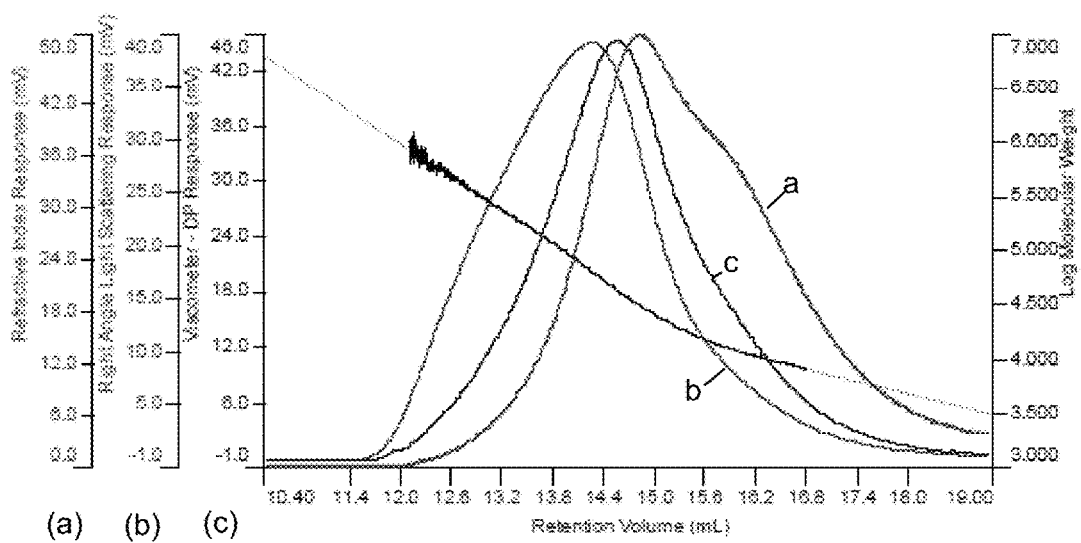
FIG. 2 is a graph showing a Triple Detection elution profile of Nylon 6, HDA using three different detectors (RALS (Right Angle Light Scattering) in green (b), UV/VIS (Ultraviolet/Visible) in blue (c), and RI (Refractive Index) in red (a)-Log MW (Log Molecular Weight) (diagonal line) (d) versus Retention Volume).

Analysis of the samples was done by Polyanalytik. Analysis was performed in 0.05 M potassium trifluoroacetate salt in hexafluoro-isopropanol (HFIP). Samples were left to dissolve for 24 hours at room temperature under gentle shaking and subsequently injected into a Viscotek TDA302 and GPCmax (ViscoGE1 (Inert Mixed-Bed High Molecular Weight GPC Column & Inert Mixed-Bed Low Molecular Weight GPC Column)) with triple detection analysis. Triple detection analysis consisted of a refractive index, right angle and low angle light scattering, and a four-capillary differential viscometer in series (FIG. 2). The absolute molecular weight of Unsaturated PA 6,6 was calculated using a dn/dc value of 0.235 mL/g, and the results of this analysis are set forth in Table 1.

TABLE 1

Triple Detection GPC Results of Triplicate Injections of Nylon Samples.

| Sample ID | Injection | $V_{peak}$ (mL) | $M_n$ (Da) | $M_w$ (Da) | $M_z$ (Da) | $M_w/M_a$ (PDI) | $[\eta]$ (dl/g) | $R_h$ (nm) | M-H $\alpha$ | M-H Log K |
|---|---|---|---|---|---|---|---|---|---|---|
| Nylon 6, DHA | 1 | 14.831 | 11,516 | 40,156 | 237,526 | 3.487 | 0.3142 | 5.124 | 0.525 | −2.823 |
| | 2 | 14.826 | 10,255 | 39,336 | 349,171 | 3.836 | 0.3131 | 5.057 | 0.519 | −2.794 |
| | 3 | 14.819 | 14,941 | 41,165 | 175,890 | 2.755 | 0.3097 | 5.24 | 0.551 | −2.961 |
| | Average | 14.8253 | 12,237 | 40,219 | 254,196 | 3.359 | 0.3123 | 5.14 | 0.532 | −2.859 |
| | σ | 0.0049 | 1,980 | 748 | 71,717 | 0.450 | 0.0019 | 0.08 | 0.014 | 0.073 |
| | % RSD | 0.03% | 16.18% | 1.86% | 28.21% | 13.40% | 0.61% | 1.47% | 2.61% | 2.55% |

NOTE:
GPC results were determined using a dn/dc value of 0.235 mL/g for Nylon 6,6 in HFIP. Average recovery of all injections was 101.05 ± 0.72%.

EXAMPLES

Example 1—Synthesis of Nylon 6,6

Figure 3:
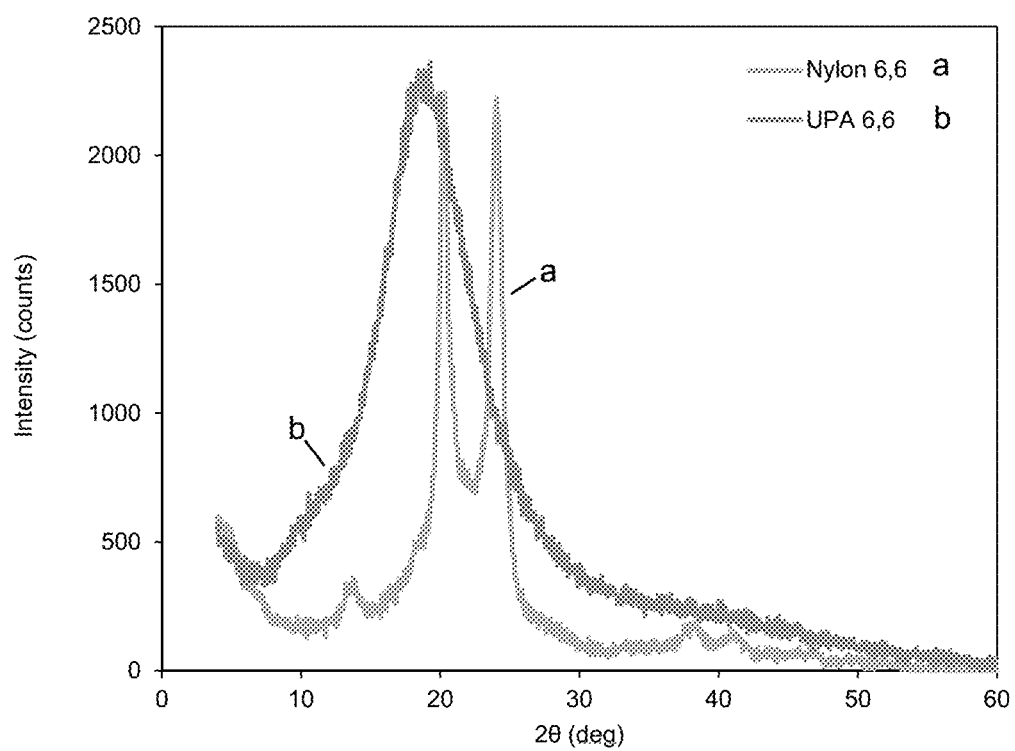
FIG. 3 is a X-ray Diffraction (XRD) graph of HDA-HMDA where a crystallization peak can be observed.
Figure 4:
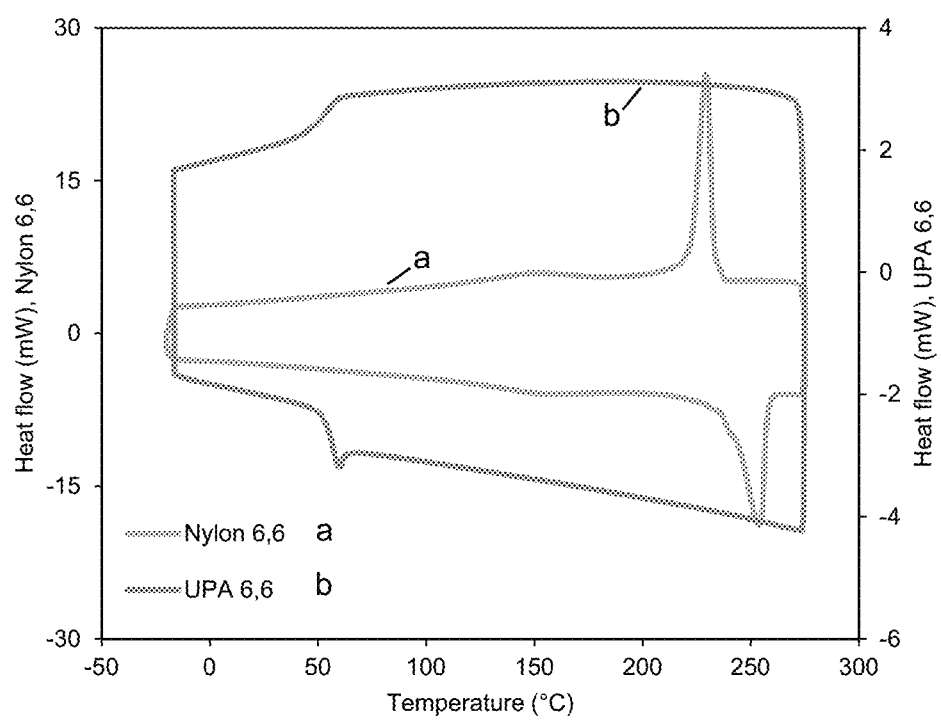
FIG. 4 is graph showing results of differential scanning calorimetry (DSC) experiment (exothermic up). The DSC displays a melting temperature of 255° C. for nylon 6,6 (a) and 60° C. for unsaturated polyamide 6,6 (UPA 6,6) (b).

The polycondensation reaction between trans-3-hexenedioic acid and hexamethylenediamine was adapted from the synthesis of nylon 6,6 [U.S. Pat. No. 4,251,653 to Eckell et al. and U.S. Pat. No. 4,442,260 to Larsen, which are hereby incorporated by reference in their entirety]. Detailed, trans-3-hexenedioic acid was purchased from TCI America, dissolved in methanol, and mixed with a 1:1 mole ratio of hexamethylenediamine dissolved in methanol. The resulting solution was heated in a round bottom flask at 60° C. The liquid was decanted from the precipitated salt. The precipitated salt was subsequently washed with methanol, decanted, and left to dry in a fume hood. To further polymerize the salt formed, 6.08 g was massed and mixed with 7.07 mL of deionized water. The resulting solution was put in an aluminum weigh pan and heated at 7.5° C./min to 250° C. in a tube furnace under flowing ultra-high purity nitrogen. The sample dwelled at the temperature for 30 min before cooling (FIG. 1). Differential scanning calorimetry, thermal gravimetric analysis, gel-permeation chromatography, rheology, X-ray diffraction, and cross-polarizing bed were used to disseminate distinct properties of the polymers (FIG. 3 and FIG. 4).

Example 3—Synthesis of Bioadvantaged Nylon 6,6

Figure 5:
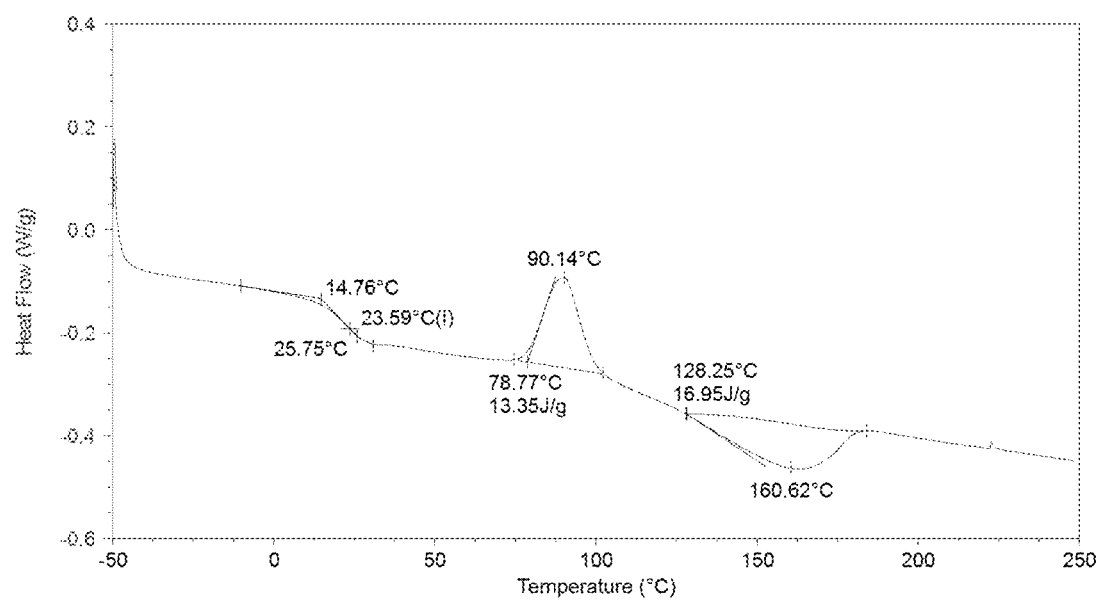
FIG. 5 is graph showing results of DSC experiment. The DSC shows a glass transition temperature at around 24° C., a melting temperature at around 160° C., and a crystallization peak at 90° C.

A bioadvantaged nylon-6,6 was synthetized by polycondensation reaction between 3-hexenedioic acid, adipic acid, and hexamethylenediamine. Detailed, trans-3-hexenedioic acid dissolved in methanol and mixed with a 1:1 mol ratio of adipic acid subsequently the mixture of 3-hexenedioic acid and adipic acid were mixed at a 1:1 mol ratio with hexamethylenediamine dissolved in methanol. The resulting solution was heated in a round bottom flask at 60° C. The liquid was decanted from the precipitated salt. The precipitated salt was subsequently washed with methanol, decanted, and left to dry in a fume hood. To polymerize the salt formed mixed with deionized water. The resulting solution was put in an aluminum weigh pan and heated at 7.5° C./min to 250° C. in a tube furnace under flowing ultra-high purity nitrogen. The sample dwelled at the temperature for 30 min before cooling (FIG. 1). Dynamic scanning calorimeter was done on the sample (FIG. 5).

Example 4—50/50 Bioadvantaged Nylon with 1% Elemental Sulfur

Figure 6:
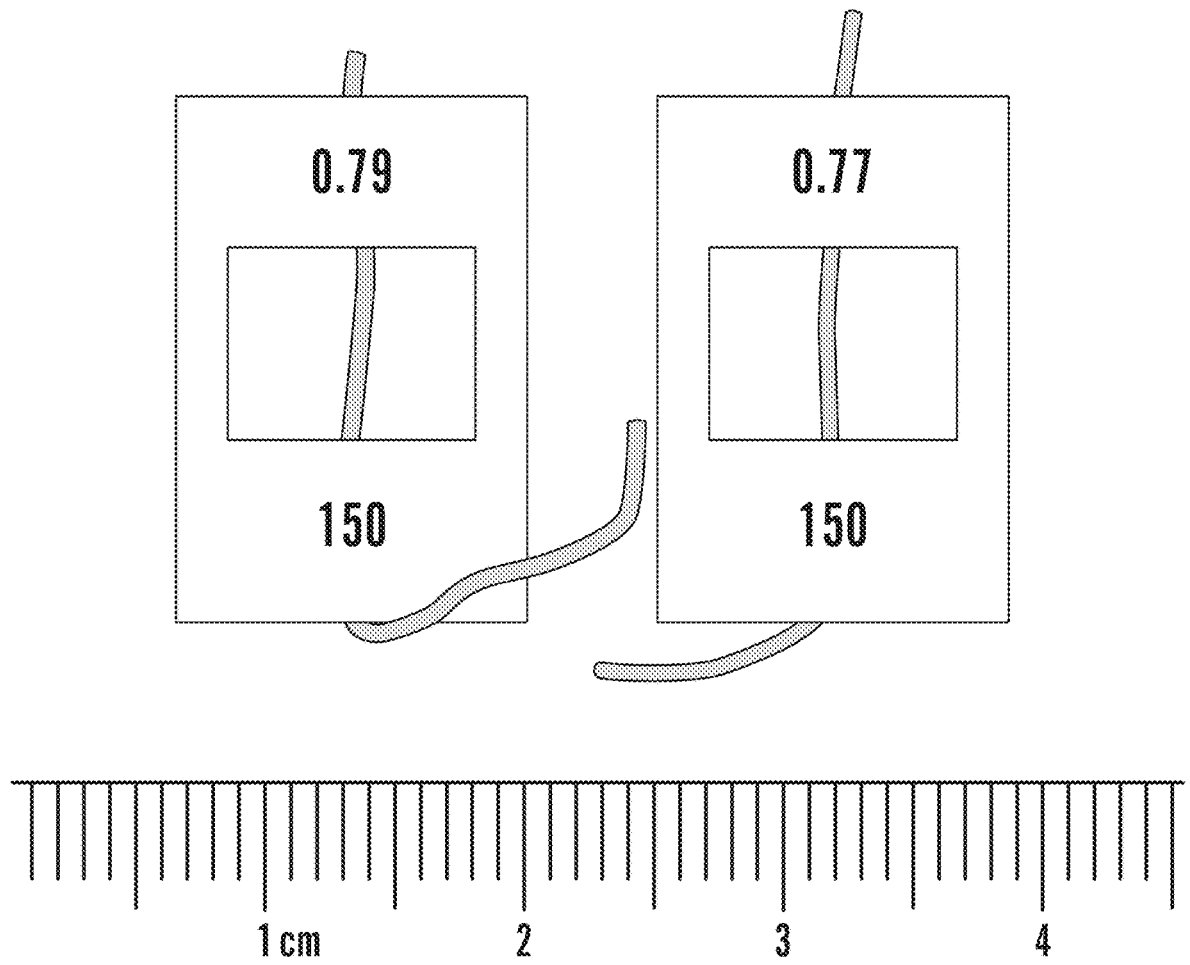
FIG. 6 is the image of samples mounted to cardstock frames.
Figure 7:
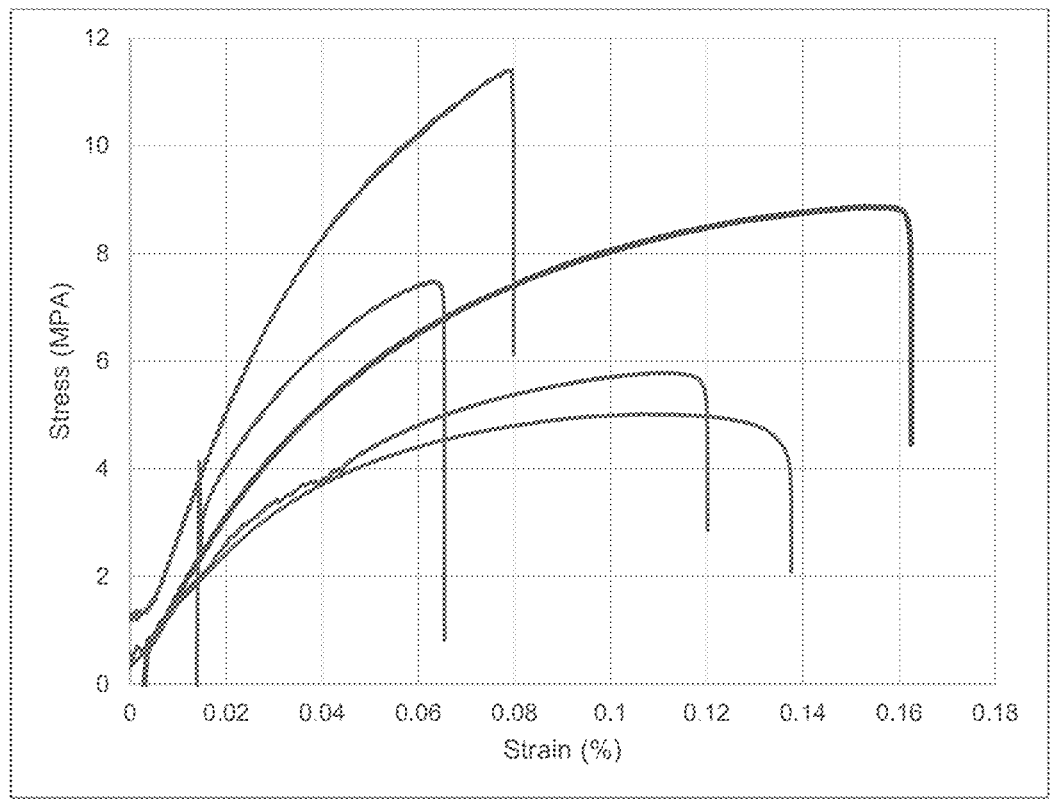
FIG. 7 is graph showing strain vs. stress curves of the 50/50 bioadvantaged nylon with 1% sulfur as crosslinker.

Five grams of the 25% 3-hexenedioic acid, 25% hexamethylenediamine, and 50% adipic acid were melted at 165° C. and compounded for 5 minutes with 1% or 2% elemental sulfur (crosslinking agent) prior to being extruded and spun into 0.1-0.5 mm diameter fibers using a DSM-Xplore fiber spinner. For tensile testing in accordance with ASTM D3822, the samples were mounted to cardstock frames with BSI 5 minute curing epoxy (FIG. 6). The assembled frames had gage lengths of 10 mm. The diameter of the extruded and spun fibers was determined using a LEICA DM4000 with a 20× objective lens. The samples were then tested in an Instron 5569 load frame at a strain rate of $10^{-3}$ s$^{-1}$ (FIG. 7).

Figure 8:
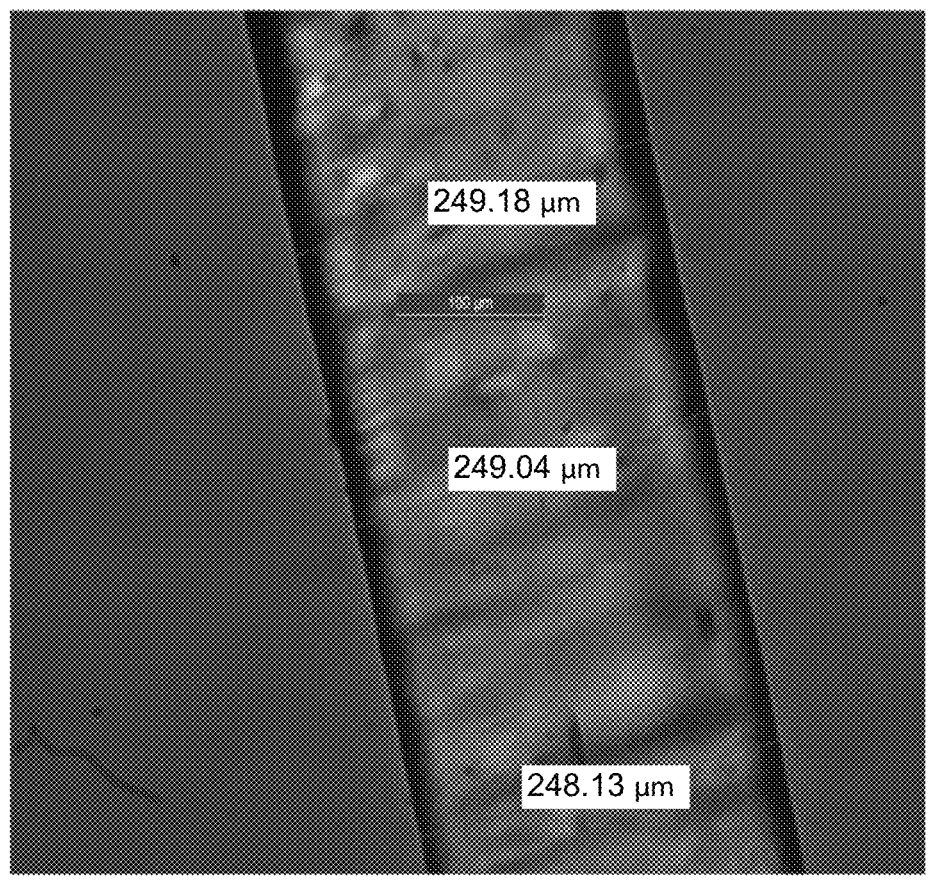
FIG. 8 is the microscope image of the 50/50 bioadvantaged nylon fiber with 2% by weight of maleic anhydride used to measure the width of then fibers.

Example 5—50/50 Bioadvantaged Nylon Fiber with 2% by Weight of Maleic Anhydride Five grams of the 25% 3-hexenedioic acid, 25% hexamethylenediamine, and 50% adipic acid were melted at 165° C. and compounded for 5 minutes with 1% or 2% maleic anhydride (crosslinking agent) prior to being extruded and spun into 0.1-0.5 mm diameter fibers using a DSM-Xplore fiber spinner. For tensile testing in accordance with ASTM D3822, the samples were mounted to cardstock frames with BSI 5 minute curing epoxy. The assembled frames had gage lengths of 10 mm. The diameter of the extruded and spun fibers was determined using a LEICA DM4000 with a 20× objective lens (FIG. 8). The samples were then tested in an Instron 5569 load frame at a strain rate of $10^{-3}$ s$^{-1}$.

Figure 9:
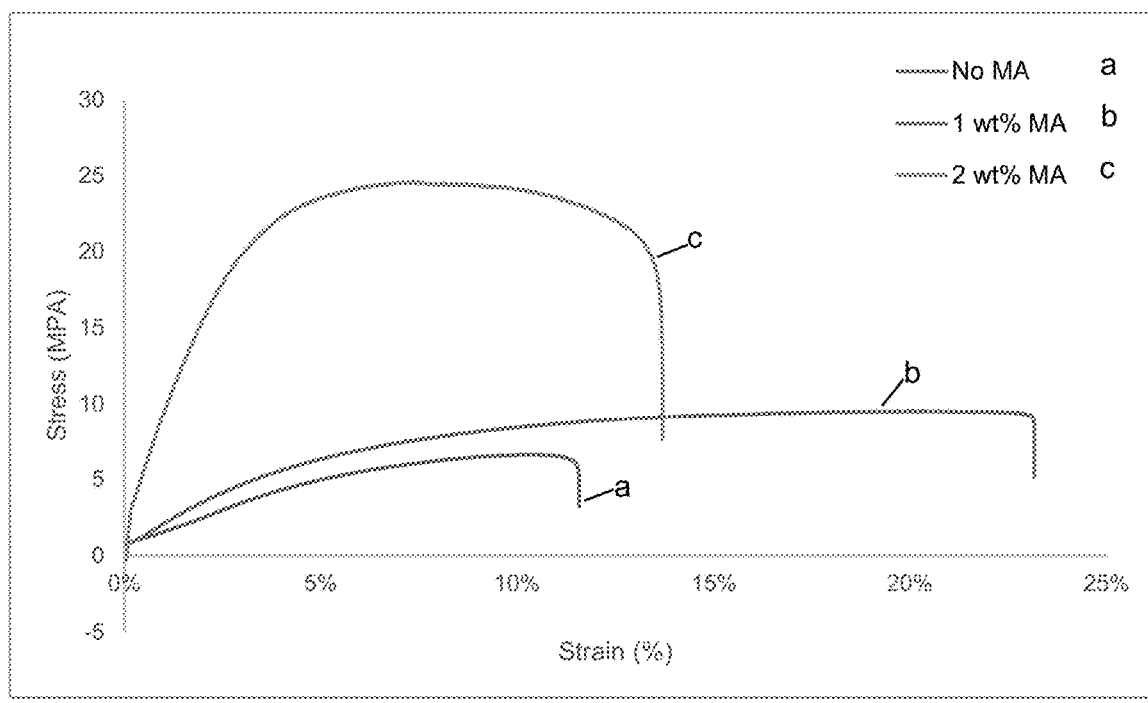
FIG. 9 is graph showing strain vs. stress curves of the 50/50 bioadvantaged nylon with no crosslinker.
Figure 10:
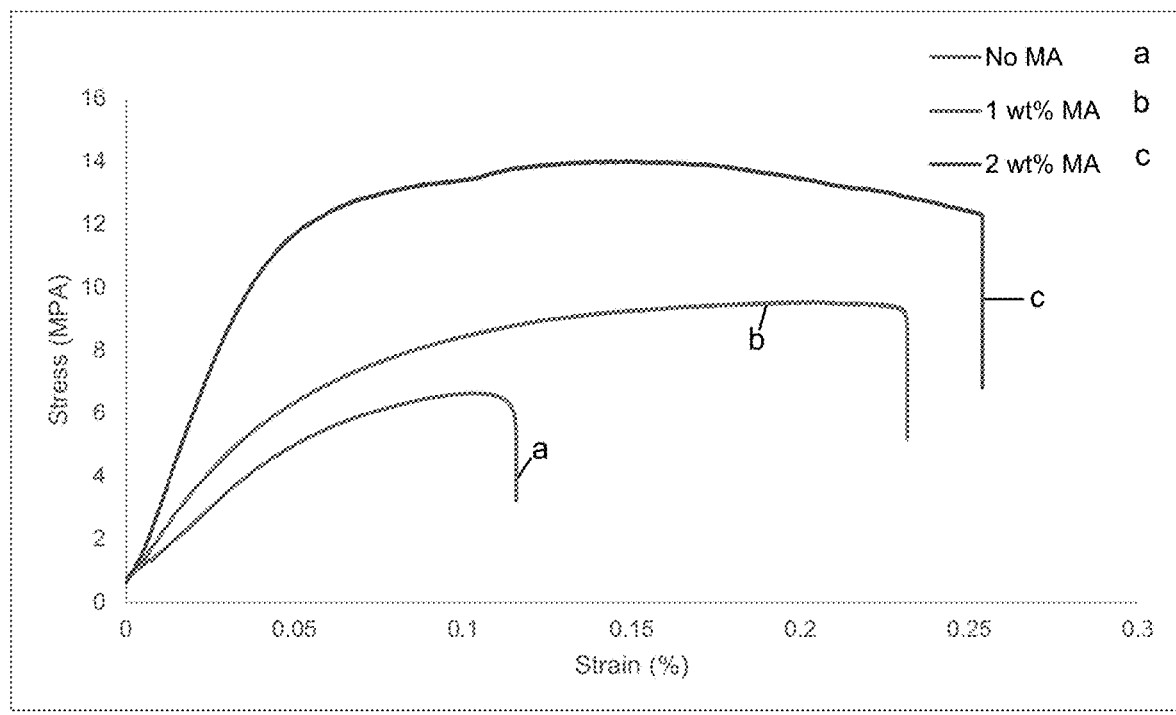
FIG. 10 is graph showing strain vs. stress curves of the 50/50 bioadvantaged nylon with 2% maleic anhydride as crosslinker.

The addition of maleic anhydride (MA) resulted in an increase in the average elastic modulus from 130 MPa with no MA to 160 MPa with 1 wt % MA and 460 MPa with 2 wt % MA (FIGS. 9 and 10).

Figure 11:
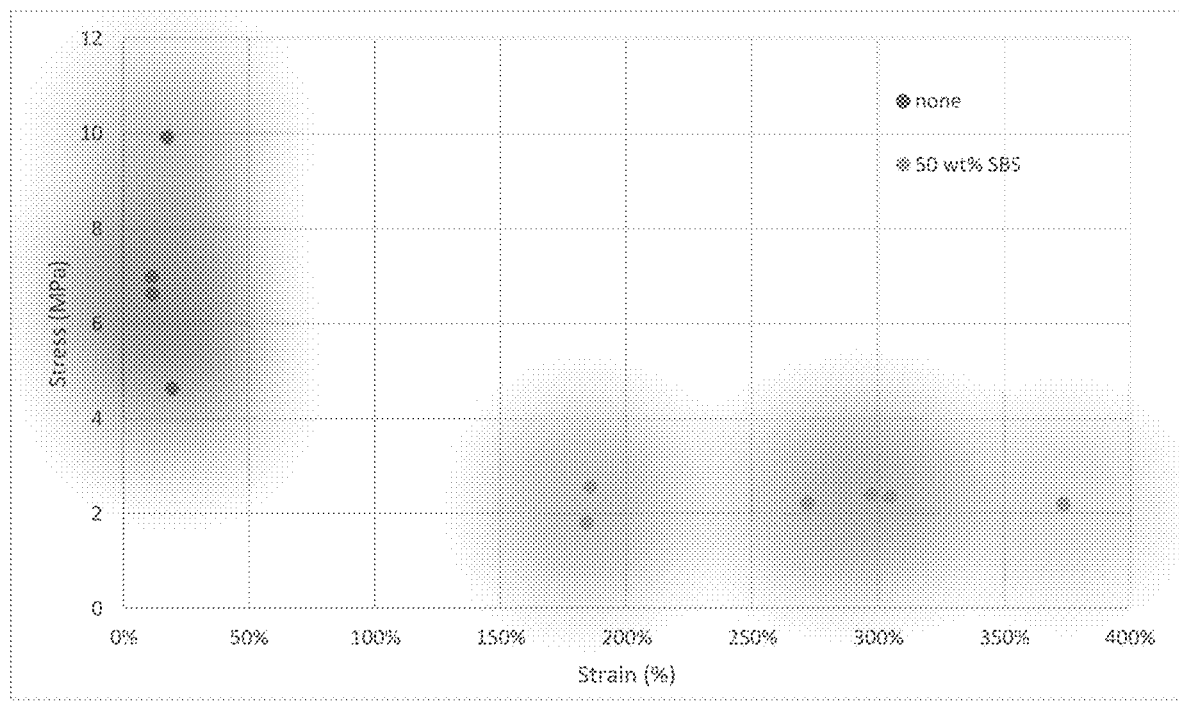
FIG. 11 is graph showing strain vs. stress curves of the 50/50 bioadvantaged nylon blended with 50 wt % SBS and 1% elemental sulfur.

Example 6—50/50 Bioadvantaged Nylon Blended with 50 wt % SBS and 1% Elemental Sulfur Five grams of the 25% 3-hexenedioic acid, 25% hexamethylenediamine, and 50% adipic acid were melted at 165° C. and compounded for 5 minutes with 1% elemental sulfur (crosslinking agent) and 50% by weight of Styrene-Butadiene-Styrene (SBS) block co-polymer prior to being extruded and spun into 0.5 mm diameter fibers using a DSM-Xplore fiber spinner. The samples were then tested in an Instron 5569 load frame at a strain rate of $10^{-3}$ s$^{-1}$. The addition of SBS resulted in an increase in the average strain from 20% with no MA to 300% with 50 wt % SBS (FIG. 11).

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A polymer comprising a repeating group having the structure of formula (I):

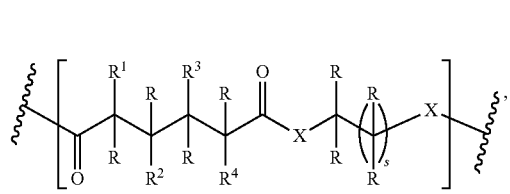

(I)

wherein
X is NH;
R is independently selected from the group consisting of H and $C_{1-20}$ alkyl;
$R^1$, $R^2$, $R^3$, and $R^4$ are independently selected from the group consisting of H, —U—$C_{1-1002}$ alkyl, wherein each —U—$C_{1-1002}$ alkyl can be optionally substituted 1 time with a substituent independently selected at each occurrence thereof from the group consisting of H, —OH, —SO$_3$R$^5$, —P(O)(OR$^5$)$_2$, —N(R$^5$)$_2$, —N(R$^5$)$_3^+$Hal$^-$, and

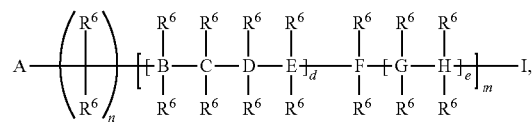

with the proviso that at least one of $R^1$, $R^2$, $R^3$, or $R^4$ is not hydrogen;
wherein $R^1$, $R^2$, $R^3$, or $R^4$ is

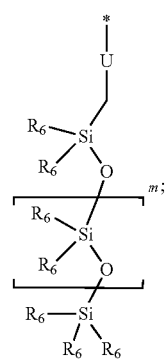

A and I are independently selected from a point of attachment to formula (I) or $R^1$, $R^2$, $R^3$, or $R^4$ or —Si(R$^6$)$_3$;
B, C, D, E, F, G, and H are independently selected from the group consisting of a bond, O, or Si;
$R^5$ is independently selected at each occurrence thereof from the group consisting of H, $C_{1-6}$ alkyl, and halogen;
$R^6$ is optional, and if present, is independently selected at each occurrence thereof from the group consisting of H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —N(R$^7$)$_2$, —C(O)R$^7$, and —C(O)—X—CH$_2$—(CH$_2$)$_s$—XR$^7$;
$R^7$ is independently selected at each occurrence thereof from the group consisting of H, $C_{1-6}$ alkyl, and

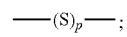

U is optional and, if present, is

—(S)$_p$—;

is a terminal group of the polymer;
a is 1-1,000,000;
b is 1-1,000,000;
c is 1-1,000,000;
d is 1-1,000,000;
e is 1-1,000,000;
m is 1 to 999,999;
n is 0 to 10;
p is 1 to 8; and
s is 1 to 50;
or a salt thereof.

2. A polymer comprising a repeating group having the structure of formula (I):

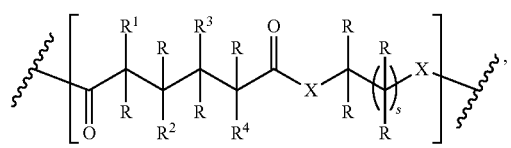

wherein
X is NH;
R is independently selected from the group consisting of H and $C_{1-20}$ alkyl;
$R^1$, $R^2$, $R^3$, and $R^4$ are independently selected from the group consisting of H, —U—$C_{1-1002}$ alkyl, wherein each —U—$C_{1-1002}$ alkyl can be optionally substituted 1 time with a substituent independently selected at each occurrence thereof from the group consisting of H, —OH, —$SO_3R^5$, —$P(O)(OR^5)_2$, —$N(R^5)_2$, —$N(R^5)_3^+$ $Hal^-$, and

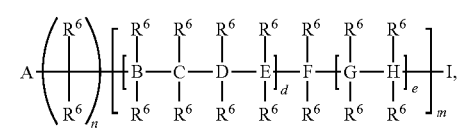

with the proviso that at least one of $R^1$, $R^2$, $R^3$, or $R^4$ is not hydrogen;
wherein $R^1$, $R^2$, $R^3$, or $R^4$ is

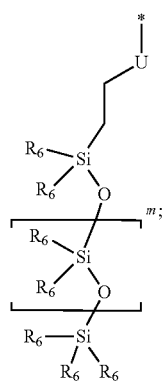

A and I are independently selected from a point of attachment to formula (I) or $R^1$, $R^2$, $R^3$, or $R^4$ or —$Si(R^6)_3$;
B, C, D, E, F, G, and H are independently selected from the group consisting of a bond, O, or Si;
$R^5$ is independently selected at each occurrence thereof from the group consisting of H, $C_{1-6}$ alkyl, and halogen;

$R^6$ is optional, and if present, is independently selected at each occurrence thereof from the group consisting of H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —$N(R^7)_2$, —$C(O)R^7$, and —C(O)—X—$CH_2$—$(CH_2)_s$—$XR^7$;
$R^7$ is independently selected at each occurrence thereof from the group consisting of H, $C_{1-6}$ alkyl, and

U is optional and, if present, is

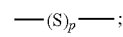

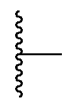

is a terminal group of the polymer;
a is 1-1,000,000;
b is 1-1,000,000;
c is 1-1,000,000;
d is 1-1,000,000;
e is 1-1,000,000;
m is 1 to 999,999;
n is 0 to 10;
p is 1 to 8; and
s is 1 to 50;
or a salt thereof.

3. A polymer comprising a repeating group having the structure of formula (I):

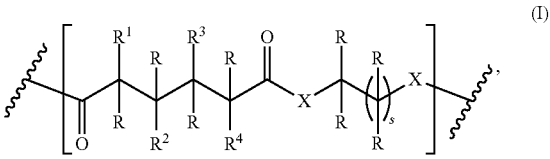

wherein
X is NH;
R is independently selected from the group consisting of H and $C_{1-20}$ alkyl;
$R^1$, $R^2$, $R^3$, and $R^4$ are independently selected from the group consisting of H, —U—$C_{1-1002}$ alkyl, wherein each —U—$C_{1-1002}$ alkyl can be optionally substituted 1 time with a substituent independently selected at each occurrence thereof from the group consisting of H, —OH, —$SO_3R^5$, —$P(O)(OR^5)_2$, —$N(R^5)_2$, —$N(R^5)_3^+$ $Hal^-$, and

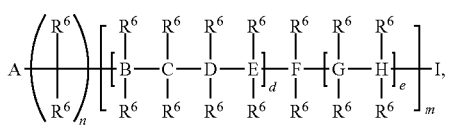

with the proviso that at least one of $R^1$, $R^2$, $R^3$, or $R^4$ is not hydrogen;
wherein $R^1$, $R^2$, $R^3$, or $R^4$ is

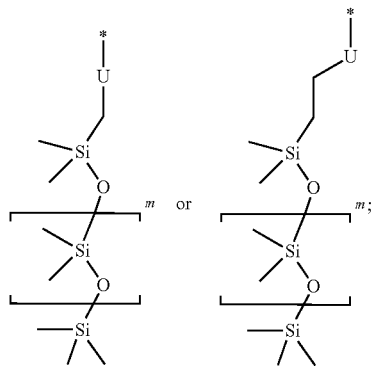

A and I are independently selected from a point of attachment to formula (I) or $R^1$, $R^2$, $R^3$, or $R^4$ or —Si$(R^6)_3$;

B, C, D, E, F, G, and H are independently selected from the group consisting of a bond, O, or Si;

$R^5$ is independently selected at each occurrence thereof from the group consisting of H, $C_{1-6}$ alkyl, and halogen;

$R^6$ is optional, and if present, is independently selected at each occurrence thereof from the group consisting of H, OH, halogen, $C_{1-6}$ alkyl, —CN, and phenyl, wherein each phenyl and $C_{1-6}$ alkyl can be optionally substituted 1-4 times with a substituent independently selected at each occurrence thereof from the group consisting of H, —OH, halogen, —CN, —N$(R^7)_2$, —C(O)$R^7$, and —C(O)—X—CH$_2$—(CH$_2$)$_s$—X$R^7$;

$R^7$ is independently selected at each occurrence thereof from the group consisting of H, $C_{1-6}$ alkyl, and

U is optional and, if present, is

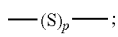

is a terminal group of the polymer;
a is 1-1,000,000;
b is 1-1,000,000;
c is 1-1,000,000;
d is 1-1,000,000;
e is 1-1,000,000;
m is 2 to 1000;
n is 0 to 10;
p is 1 to 8; and
s is 1 to 50;
or a salt thereof.

4. A polymer comprising a repeating group having the structure of formula (Ig):

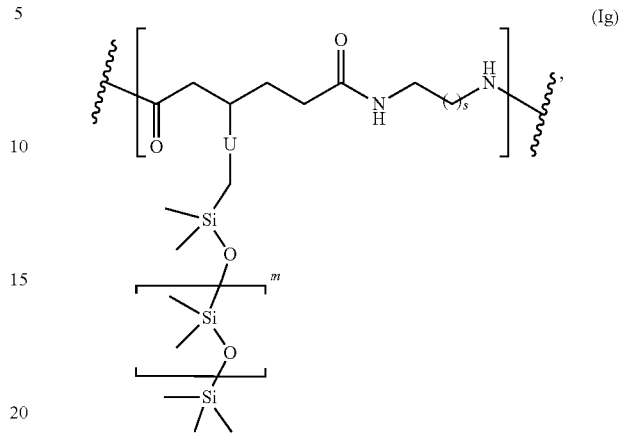

wherein
U is optional and, if present, is

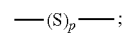

is a terminal group of the polymer;
s is 1-50;
p is 1 to 8; and
m is 2-1000;
or a salt thereof.

5. A polymer comprising a repeating group having the structure of formula (Ig'):

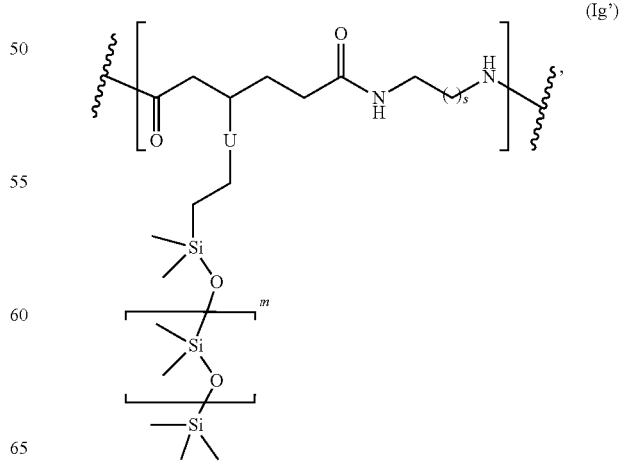

wherein
U is optional and, if present, is
$-(S)_p-$;
is a terminal group of the polymer;
s is 1-50;
p is 1 to 8; and
m is 2-1000;
or a salt thereof.
* * * * *